United States Patent
Levine

(10) Patent No.: US 6,914,964 B1
(45) Date of Patent: Jul. 5, 2005

(54) SYSTEM AND METHOD FOR ESTABLISHING AUTOMATIC MULTIPOINT NETWORK CONNECTIONS IN A COMMUNICATIONS ENVIRONMENT

(76) Inventor: Richard C. Levine, 7950 Woodstone, Dallas, TX (US) 75248

( * ) Notice: Subject to any disclaimer, the term of this patent is extended or adjusted under 35 U.S.C. 154(b) by 286 days.

(21) Appl. No.: 10/405,337

(22) Filed: Apr. 1, 2003

(51) Int. Cl.$^7$ .............................................. H04M 11/00
(52) U.S. Cl. ....................................... 379/52; 379/93.15
(58) Field of Search ................................ 379/52, 93.15, 379/93.14, 100.13, 93.01, 93.17

(56) References Cited

U.S. PATENT DOCUMENTS

| | | | |
|---|---|---|---|
| 5,475,733 A | 12/1995 | Eisdorfer et al. | 379/52 |
| 5,680,443 A | 10/1997 | Kasday et al. | 379/67 |
| 5,745,550 A | 4/1998 | Eisdorfer et al. | 379/52 |
| 5,787,148 A * | 7/1998 | August | 379/52 |
| 5,875,422 A | 2/1999 | Eslambolchi et al. | 704/3 |
| 5,917,888 A * | 6/1999 | Giuntoli | 379/52 |
| 6,076,121 A | 6/2000 | Levine | 710/62 |
| 6,308,087 B1 | 10/2001 | Aoshima | 455/575 |
| 6,324,280 B2 | 11/2001 | Dunn et al. | 379/230 |
| 6,370,498 B1 | 4/2002 | Flores et al. | 704/3 |
| 6,477,494 B2 | 11/2002 | Hyde-Thomson et al. | 704/260 |
| 6,510,206 B2 | 1/2003 | Engelke et al. | 379/52 |
| 6,668,043 B2 * | 12/2003 | Hyziak et al. | 379/52 |
| 6,763,089 B2 * | 7/2004 | Feigenbaum | 379/52 |

* cited by examiner

*Primary Examiner*—Stella Woo
(74) *Attorney, Agent, or Firm*—Baker Botts L.L.P.

(57) ABSTRACT

A method for establishing a communication session is provided that includes receiving a query at a database that includes a selected one or both of a phone number associated with a first end user and a phone number that was input by the first end user to establish a communication session with a second end user. A situation associated with the communication session may be identified based on a plurality of functional purpose (FP) codes stored in the database and associated with a selected one or more of the first and second end users. A telecommunications relay service (TRS) or gateway switch routing number, a network routing number for a third point, and an initial address message (IAM) may be communicated. A communication assistant or translator element may be invoked, in response to the IAM, such that the communication session is facilitated between the first and second end users.

50 Claims, 4 Drawing Sheets

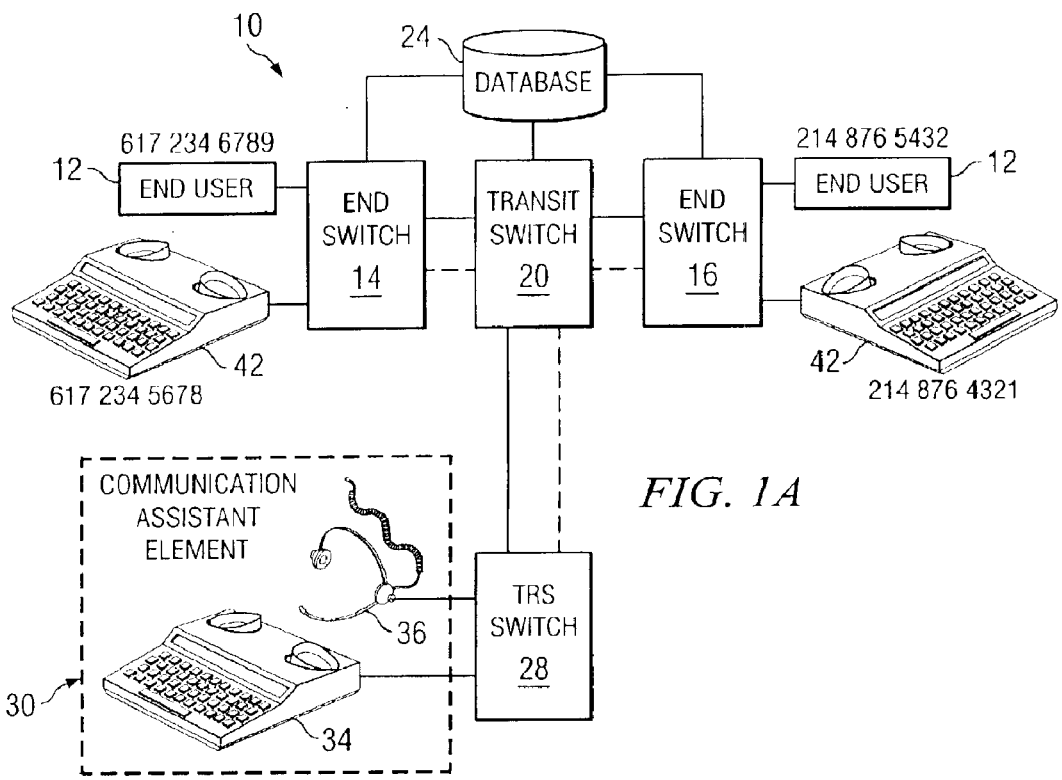

| NAME | USER DESCRIPTION | CA CONFIGURATION |
|---|---|---|
| VOICE CARRY OVER (VCO) | SPEAKS UNDERSTANDABLY (TYPICALLY LATE DEAFENED OR HARD OF HEARING), CAN USE A "RECEIVE ONLY" ALPHABETIC TTY DISPLAY | CA TYPICALLY ONLY TRANSLATES VOICE INTO TEXT IN ONE DIRECTION FOR PURPOSES OF END-TO-END COMMUNICATION |
| HEARING CARRY OVER (HCO) | HEARS ADEQUATELY BUT UNABLE TO SPEAK UNDERSTANDABLY, SO USES A KEYBOARD INSTEAD | CA TYPICALLY TRANSLATES TEXT INTO VOICE IN ONE DIRECTION ONLY |
| 2 LINE VCO (2LVCO) | LIKE VCO, BUT USES TWO DISTINCT SIMULTANEOUS TELEPHONE CHANNELS BETWEEN THE SUBSCRIBER AND THE TRS CENTER. ONE FOR DISPLAY OF INCOMING TEXT, THE OTHER FOR SIMULTANEOUS OUTGOING VOICE | IN ADDITION TO THE FIRST LINK FROM THE ORIGINATOR TO THE TRS CENTER AND THE SECOND LINK FROM THE TRS TO THE DESTINATION, THE TRS ALSO SETS UP A THIRD LINK FROM THE TRS SWITCH TO A DESIGNATED NETWORK POINT AT THE 2LVCO |
| SPEECH-TO-SPEECH (STS) | TYPICALLY HAS HEARING ABILITY BUT SPEECH IMPAIRMENT | CA, TRAINED TO UNDERSTAND VARIOUS TYPES OF IMPAIRED SPEECH, REPEATS ALL SPEECH. NO TTY IS UTILIZED |

FIG. 1D

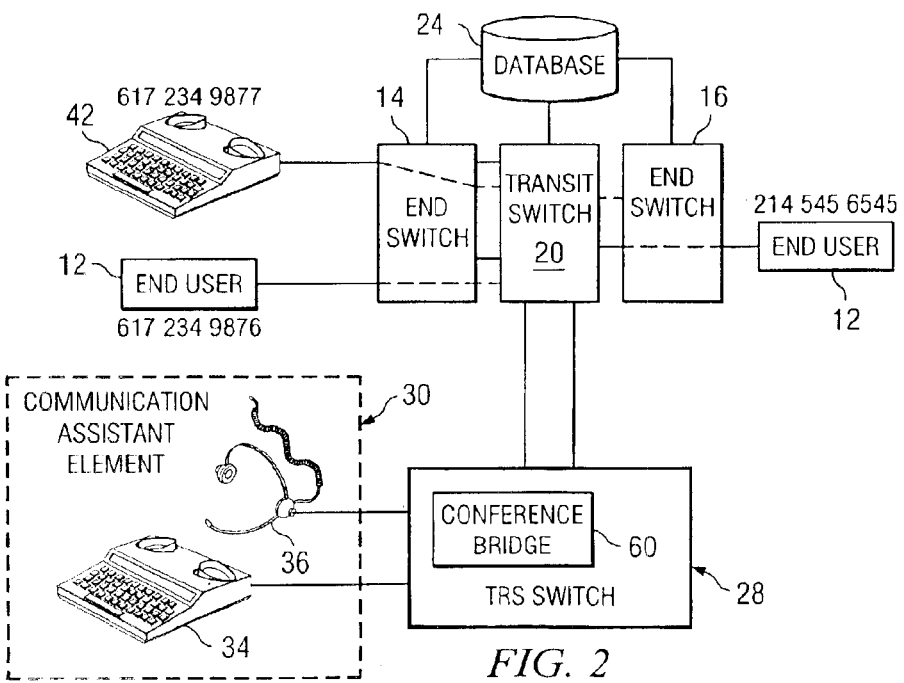

FIG. 2

SYSTEM AND METHOD FOR ESTABLISHING AUTOMATIC MULTIPOINT NETWORK CONNECTIONS IN A COMMUNICATIONS ENVIRONMENT

TECHNICAL FIELD OF THE INVENTION

This invention relates in general to the field of communications and more particularly to a system and method for establishing automatic multipoint network connections in a communications environment.

BACKGROUND OF THE INVENTION

Communications have become increasingly more complex and sophisticated in today's society. One aspect of communications relates to the configuration of architectures in order to accommodate a plethora of diverse situations and/or end users. For example, many situations involve two (or more) end users/entities that may or may not be compatible with each other. Recognizing such distinguishing characteristics may be important for properly routing information and accurately distributing data in a communications environment. Thus, the ability to identify entities or end users participating in a communications session, as well as the type of communication session that may be sought to be established, may be important in providing proper communications platforms.

In some of these scenarios, end users may seek to communicate collectively in a group. Such conferencing scenarios also necessitate the ability to properly interface and communicate in a communications environment. Moreover, technological deficiencies or utilizing equipment that cannot facilitate the communication session properly may inhibit the ability of end users to exchange information. Additionally, other communication parameters (such as language barriers, connection faults, the transmission of complex information or multi-media data, etc.) may operate to restrict effective communications and present significant obstacles for end users or network operators that seek to communicate in an optimal fashion.

SUMMARY OF THE INVENTION

From the foregoing, it may be appreciated by those skilled in the art that a need has arisen for an improved communications approach that offers the ability to properly accommodate and establish multipoint network connections in a communications environment. In accordance with one embodiment of the present invention, a system and method for establishing multipoint network connections are provided that substantially eliminate or greatly reduce disadvantages and problems associated with conventional communication techniques.

According to one embodiment of the present invention, a method is provided for establishing connections in a telecommunications network environment that includes receiving a query at a database that includes a selected one or both of a phone number associated with a first end user and a phone number that was input (e.g., dialed) by the first end user to establish a communication session with a second end user. A situation associated with the communication session may be identified based on a plurality of functional purpose or property (FP) codes stored in the database and associated with a selected one or more of the first and second end users. A telecommunications relay service (TRS) routing number, a network routing number for a third point, and an initial address message (IAM) or other call processing messages may be communicated. A communication assistant (CA) element may be invoked, in response to the IAM, such that the communication session is facilitated between the first and second end users.

Certain embodiments of the present invention may provide a number of technical advantages. For example, according to one embodiment of the present invention, a communications approach is provided that automatically establishes a network connection involving more than two network end point participants. The approach may further utilize the appropriate and/or optimal location gateway, telecommunications relay service (TRS) center, conference equipment, or other translation/conversion tools that may be automatically interposed between the various participating network end points in a connection. Such an architecture achieves an optimal network configuration and may further establish the appropriate type of technological and/or human language conversion or translation.

Another technical advantage associated with one embodiment of the present invention relates to flexibility in accommodating a diverse group of end users. The communications approach operates to relieve the end user(s) and other participants from the burden of remembering and/or manually dialing special numbers and/or selecting the various gateways, conference bridges, or other translation/conversion elements needed for a particular connection. This significantly reduces the complexity associated with establishing and maintaining a given communication session.

Yet another technical advantage associated with one embodiment of the present invention relates to speed and effectiveness. A communications architecture is provided that establishes a connection quickly and directly such that end users do not perceive a significant delay or procedural distinction compared to setting up two-party connections. This further offers significant convenience and a considerable time savings in comparison with other more lethargic communications architectures that provide a significant delay in similar scenarios. Certain embodiment of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1A is a simplified block diagram of a communication system for establishing automatic multipoint network connections in a communications environment in accordance with one embodiment of the present invention;

FIG. 1B is a simplified table illustrating an example network address index and corresponding data records for a database that may be included within the communication system;

FIG. 1C is a simplified table illustrating an example set of types of end users and connections that may utilize the communication system;

FIG. 1D is a simplified table illustrating an example set of additional types of communication impaired end users and communication assistant configurations that may be implemented in one embodiment of the communication system;

FIG. 2 is a simplified block diagram of one embodiment of the communication system and further illustrates an example interaction therein;

DETAILED DESCRIPTION OF EXAMPLE EMBODIMENTS OF THE INVENTION

Figure 3:
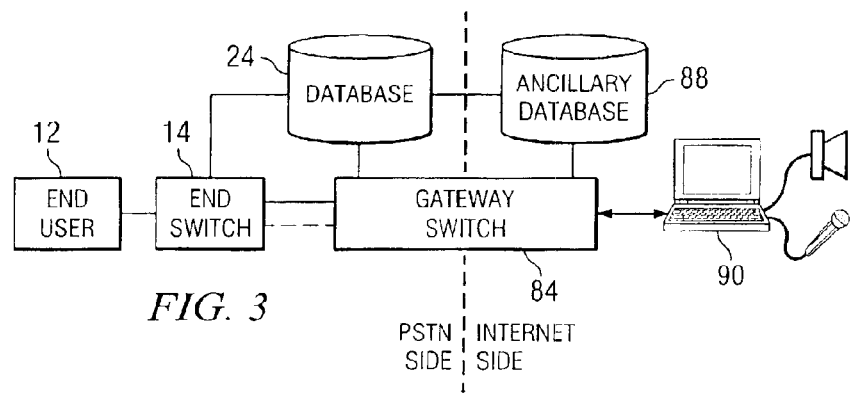
FIG. 3 is a simplified block diagram illustrating an alternative embodiment of the communication system.

FIG. 1A is a simplified block diagram of a communication system 10 for establishing automatic multipoint network connections in a communications environment. Communication system 10 may include multiple end users 12, end switches 14 and 16, a transit switch 20, and a database 24. Communication system 10 may additionally include a communication assistant (CA) element 30 that includes a teletypewriter (TTY) 34 and a headset 36. Communication assistant element 30 may be coupled to transit switch 20 by a telecommunications relay service (TRS) switch 28. Additionally, communication system 10 may include multiple additional teletypewriters 42 that are coupled to end switches 14 and 16. Communication system 10 may be provided in any suitable communications environment such that data or information exchanges between end users 12 are facilitated. For example, communication system 10 may be employed in connection with a standard public switched telephone network (PSTN) system or in a network environment. Additionally, communication system 10 may be positioned in any other suitable scenario, arrangement, configuration, or architecture that seeks to provide some type of communications platform to a set of end users.

According to the teachings of the present invention, database 24 operates to store codes that denote functional purposes or properties (FP) of various network end points accessible to a given telecommunications network. Database 24, acting together with an originating end switch 14 or 16) may additionally automatically cause an originator-dialed call to include more than two network points. Database 24 may be implemented in order to autonomously interpose a human (or a machine where appropriate) interpreter, or converter between otherwise incompatible end users 12. For example, a person who may be hearing impaired and who uses a teletypewriter 42 may be accommodated such that his information may be properly received by a reciprocal end user seeking to communicate with the hearing impaired person. Additionally, communication system 10 may be extended between two persons unable to understand the same human language, or provided in conjunction with a gateway between a circuit switched telephone network and an Internet packet voice over multimedia network. Database 24 may also be optimally positioned such that its influence encompasses a conference bridge (or similar structure) in a multipoint conference communication session. (A broadcast connection is a sub-type of conference call, and the term "conference" may be used to describe both.) Database 24 may be further extended to be used in conjunction with broadcasting or wiretapping such that information may be properly transmitted and received in order to glean the selected or desired information without prior knowledge from either of the participating parties.

Communication system 10 uses database 24 that is accessible to a telecommunications network to provide information regarding FP codes. These codes, or default FP codes based on various criteria when there are no explicit FP codes, may describe the intended use(s) for each network point. In some cases, codes may be dialed as well in conjunction with dialing a call to indicate a temporary modification or addition to the codes in the database. The relevant codes, when interpreted by suitable hardware or a software program, may produce routing network addresses and other parameters that cause desired connections to be established in the appropriate telecommunication networks. In certain applications, the present invention may be used to provide a plurality of capabilities simultaneously.

Communication system 10 achieves an optimal network configuration and may be used to establish the appropriate type of technological and/or human language conversion or translation. Communication system 10 also operates to relieve end user(s) and other participants from the burden of remembering and/or manually dialing special numbers and/or selecting the various gateway, conference bridges or other translation/conversion elements needed for a particular connection. This significantly reduces the complexity associated with establishing and maintaining a given communication session.

Communication system 10 additionally provides a communications architecture that establishes a connection quickly and directly such that end users 12 do not perceive a significant delay or procedural distinction compared to setting up an ordinary two-party connection. This further offers significant convenience and considerable time savings in comparison with other more lethargic communications architectures. Communication system 10 also provides a communications platform that may be leveraged with existing technologies such that the cost of necessary hardware or software development may be minimal. A simple verbal or plain language description of the call process may be sufficient for a programmer to implement the necessary software upgrades in order to effectuate the teachings of the present invention.

End user 12 may use a telephone and may be a client or a customer wishing to initiate a communication session in communication system 10 via some communications platform. End user 12 may be representative of an end point (both terms being used interchangeably herein) of a communication session. End user 12 may be inclusive of devices used to initiate a communication, such as a computer, a personal digital assistant (PDA), a laptop or an electronic notebook, a telephone (in an example embodiment), a mobile station, or any other device, component, element, or object capable of initiating or receiving voice or data exchanges within communication system 10. End user 12 may also be inclusive of a suitable interface to the human user, such as a microphone, a display, a keyboard, a teletypewriter (e.g. TTY 42), or other terminal equipment (such as for example an interface to a personal computer or to a facsimile machine in cases where end user 12 may comprise a modem). End user 12 may also be any device that seeks to initiate or receive a communication on behalf of another entity or element, such as a program, a database, or any other component, device, element, or object capable of initiating or receiving a voice or a data exchange within communication system 10. Data, as used herein in this document, refers to any type of numeric, voice, video, audio-visual, or script data, or any type of source or object code, or any other suitable information in any appropriate format that may be communicated from one point to another.

End switches 14 and 16 are communicative elements that may be coupled to multiple end users 12 and 42 and facilitate the transmission and delivery of data or information. End switches 14 and 16 may be routers, bridges, gateways, switches, or any other suitable element that operates to exchange data. End switches 14 and 16 may also be coupled to database 24 and exchange information therewith based on current system parameters.

Database 24 is a data storage element that may store FP codes or any other suitable information that facilitates the interfacing or accommodation of multiple end users 12 and 42. Database 24 may be any electronic element used to store, organize, or retrieve data, and may include any suitable accompanying processor, hardware, software, components, devices, objects, or elements operable to facilitate the operations thereof. Database 24 may contain descriptive data relevant to one or more network end points. The data may be placed in database 24 in advance of its use for a particular connection, or may be entered contemporaneously with the setup of a connection as described in more detail below. For purposes of reliability database 24 may be properly duplicated in accordance with particular needs. For purposes of providing enhanced functionality, the overall data may be divided into geographically separate groups, whereby each group may be stored in a regional database, rather than all data being in a single database 24. Another alternative implementation may be a logical and/or physical separation of said FP data into two or more databases: one comprising the origination-related FP code(s) of certain network end points, and one that is a logically or physically distinct database comprising the destination-related FP code(s) relevant to those same network end points. In use, the relevant origination-related codes of the originator and the relevant destination-related codes of the desired destination may be compared and analyzed in the same manner as described in examples herein for an implementation in which both are in the same logical and/or physical database. In a particular embodiment, database 24 may include a simple list of data or a complicated cross-linked relational database such as a structured query language (SQL) database system. Certain examples of database content are illustrated herein in this document via tables or lists; however, these elements are for purposes of teaching only and, accordingly, should not be construed to limit or constrain the type of stored information or the database organizational architecture to any particular structure.

In operation of an example embodiment, when a call is dialed, database 24 may be examined by the originating telecommunications switch, or by another appropriate switch in the network, and the data in database 24 may be used to determine the network point(s) to be connected. In cases where existing databases and switches are used to implement the present invention, modifications or upgrades in the software used in the processors that control the switches and databases may be performed.

The descriptive information for a network end point may comprise one or more of the following types of data items. In general, the first type of data items comprises FP codes that typically describe what the network end point user or owner wishes or intends to do with that network end point. For example, a data record describing a particular network end point may have one or more human language codes, indicating that the user of that network end point has the ability to understand or speak, for example, Spanish, French, or some other human language. As another example, a network end point may be used for a fax machine, a teletypewriter for the deaf, (which may be referred to as a TTY or TDD as used herein in this document), a radio pager, a telephone used by a juvenile member of a family, etc. A plurality of such FP codes may be used for any network end point's data record.

FP codes may be entered into database 24 by an end user, a system operator of the network, a government entity, or any other appropriate administrative authorities. FP codes may be entered via the same terminal device used for normal network connections. For example, the telephone dial may be used for entry or modification of certain FP codes. FP codes may also be entered or modified via other means or methods, such as via an alphabetic keyboard using the Internet or other data communication facilities by scanning a bar code with an optical wand, or via interaction with an Internet web page. Such data communication facilities may optionally be secured via encryption and utilize a password and a graphic user interface (GUI). Additionally, such elements may be interactive in interfacing with the user by (for example) offering a menu of codes and/or alternative entry selections in order to resolve a situation when a logically inconsistent FP code entry may be attempted. The GUI may present a menu of allowed FP codes with optional descriptive text or pictorial explanation or enlargement thereon, and the user could click on the desired symbol using a computer mouse.

Some FP data entries may be automatically entered for all end points that are known in advance to have a certain property. For example, all of the telephone network end points used for a particular installed radio pager system may be readily automatically labeled with an FP code indicating that each network end point may be a radio pager, eliminating the need for a manual data input for each such network end point.

FP codes may also have secondary properties. Individual FP codes may be marked, when entered for use with a particular network end point, to indicate that they apply to: 1) origination, 2) destination, or 3) two-way uses in a given connection. Individual FP codes may also be marked to indicate that they are: 1) mandatory, 2) preferred (i.e. acceptable), or 3) forbidden. Such marking may be accomplished upon input by selecting from a menu or by input of further modifier FP codes. These elements may be indicated in database 24 by bit flags, by storage in certain designated data fields where their presence indicates specific secondary properties, or via any other suitable database organizational methods. Certain default secondary properties and additional FP codes may be automatically entered in response to the entry or selection of a first FP code, and such default secondary properties and/or additional FP codes may then be subject to further modification by the person performing the data entry. Logically consistent combinations of such usage categories is permissible in communication system 10.

In operation of an example interaction, an FP code entry may be executed from the same -terminal device(s) used by an end user for network access. To enter an FP code from a telephone dial one may lift the handset, and, in response to hearing a dial tone, dial a character sequence reserved for the purpose of FP code data entry (inputting one or more characters for each FP code). FP code entries may be concatenated with the first code. When finished entering FP codes, the user may hang up the handset. For example, the FP code entry for a TTY network end point could be dialed on a North American telephone dial using the four characters *338. That code is not presently assigned for a conflicting purpose in the North American PSTN numbering plan or dialing plan. A rotary dial may be used to dial the equivalent code using the five digits 11338. (Such a logical equivalence of the initial '11' digits to an initial*character is generally known and should be recognized in all similar examples described herein.) In this description of an example embodiment, the same dialed FP code value and internal FP code value may be used, but in an example implementation, the internal code corresponding to *338 may be completely different. The corresponding internal code may be 2073, as represented in decimal digits. Also, different internal and input format FP codes may be of different lengths, not all comprising just four keystrokes as in this example.

Certain FP codes may be input substantially at the time a call is dialed by dialing or typing characters in the form of a prefix, infix, or suffix to the dialed destination telephone number. In an example embodiment, such code entries made substantially at the time a call is dialed may apply for that one call only, and may not produce a permanent modification of the stored FP codes in the database. For example, an originating telephone network end point that may be primarily used for outgoing voice calls may be occasionally used for outgoing TTY calls. An outgoing TTY call directed from the point to the destination number 876 5432 (in an area where 7 digit local dialing may be in effect) may be dialed using the following 11 keystrokes: *338 876 5432. The dial tone may re-appear during part of such a prefixed dialing process, and also the *338 prefix may be dialed by an automatic dialer device associated with a TTY in contrast to manual dialing. In this example, the call may seek a TTY destination associated with the dialed destination subscriber, or a connection via a TRS center if the previous objective cannot be achieved.

A second type of data in database 24 may reflect a pointer or a linkage to other network end points that are associated with each other because of various logical linkages. For example, one type of linkage may be that of common ownership by a particular end user or subscriber. The subscriber typically rents or leases telecommunication service and equipment. If a certain subscriber has a wired voice telephone, a wired fax machine, a cellular radiotelephone, or an Internet data terminal for example, database 24 may indicate that all of these are associated with the same end user or subscriber 12, or with his or her family (in the residential context) or with his or her employer and/or work group or department. Input of FP codes describing the properties of a first one of such network end points may be accepted from the dial of a second such network end point or via a data communication link initially established for use relevant to the first of such network end points. Some end points may be located in networks or sub-networks having different technology or different network service providers.

A third type of data that may reside in database 24 or other relevant databases accessible to the network may comprise network or data storage locations or destination addresses such as those of gateways in the network used in various ways in database 24 relevant to such network end points. The network addresses may be given explicitly or indicated by a pointer or linkage or a plurality of pointers or linkages. Network addresses may comprise pseudo-numbers as well as dialable decimal numbers. As used in this disclosure, the term "pseudo-number" is an inclusive term describing both dialable numbers and also codes, typically used as a network address, some of which cannot be dialed to effectuate a connection from a subscriber network end point (although certain repair technician equipment may be allowed to do so). This lack of dialing capability may be due to any one or more of several reasons, of which two examples are provided. A pseudo-number may defy the rules of the network numbering or dialing plan, for example 1032567 in North America. The digits of a pseudo-number may be represented in some parts of the network in a four-bit binary digit code and a non-dialable pseudo-number may comprise a digit represented by a binary code such as 1110 which has no corresponding decimal digit. (Note that in each instance where a network address is described as a number in this disclosure, the term pseudo-number is equally applicable.) Locations of data in data storage devices may, for example, include data describing the medical history of the subscriber (s) associated with a particular network address, or a training data set of digital data derived from previously repeated spoken audio utterances of certain words,. or pointers or linkages thereto. Database 24 may also include data used in conjunction with certain types of automatic speech-to-text software that performs most accurately when it can utilize such training data for a particular speaker.

In addition to the three types of data described supra, other suitable types of data may also be stored in database 24 or ancillary data bases associated therewith. For example, an optional parameter may be stored in the data record relevant to a particular telephone line reflecting the temporary storage of the destination number most recently dialed by that specific network end point. A further example may be a parameter stored to indicate (regarding that most-recently-dialed call) if it may be still in progress, or alternatively, that it has ended. This may be used for certain conference communication setup processes, for example. Supporting this data item involves inclusion of a parameter in the messages from database 24 to the originating end switch 14 that directs the originating end switch 14 to communicate a message to database 24 when the call may be disconnected.

In applications in which an optimal conference connection configuration is used, a cost calculation process may be involved in communication system 10. This may make use of a table or a list of costs relevant to calls between various pairs of network points. The cost calculation process may be provided by database 24 or a separate and distinct database and related processor that communicates with database 24 and its associated processor via any data communication device or element. In an alternative example embodiment, this may be used to consolidate such data and processing into database 24. Such a scenario is described in more detail below with reference to conference connection scenarios.

FIG. 1B is a simplified table 44 illustrating an example network address index and corresponding data records for a database that may be included within communication system 10. Table 44 may be used in order to illustrate an example embodiment of communication system 10 in operation and may include a network address column 46 and an FP code column 48. Alternatively, table 44 may include any additional information or data operable to facilitate the operations of communication system 10. In the example provided, a PSTN may be invoked for the purpose of providing an automatic setup of a call involving a voice originator having network address (telephone number) 617 234 5678, served by an originating end switch 14. End user 12 (the originator) having telephone number 617 234 6789 may wish to communicate with a TTY destination having network address 214 876 4321, served by a destination end switch 16. The originator may or may not know that TRS switch 28, is necessary as a gateway to translate between voice and a TTY. In the example offered for purposes of teaching, the originating telephone 617 234 5678, installed at originating end switch 14, may be used to dial the destination telephone number of the network destination TTY, namely 214 876 4321.

The originator does not dial any other codes or digits, such as 711 (a dialed code generally used to connect with a TRS center), for the purpose of invoking TRS switch 28. TRS switch 28 may be one that is provided already in each state or province and properly staffed by human communication assistants (CAs) who interpret or translate (in telephone connections) between deaf TTY users and hearing-speaking participants. It is important to note that use of a 'ICA' offers just one type of "translator." Additionally, other types of translators may be used, such as voice coding translators converting from one type of digitally coded speech to another, or human translators (for example for English-Spanish), and future automatic English-Spanish translator software, or automatic speech-to-text software or systems. The CA and TRS examples used here are helpful in illustrating the principles that apply to various types of telecommunication networks, but are not inclusive of the application scope of the present invention. Although the examples show a TRS switch and a human CA work position, they are used because such elements may be particularly complex. The teachings of these elements are applicable to any human or non-human "translator" device (s) in accordance with particular needs.

Upon completion of the originator's dialing, the internal call processing control computer, which may be an integral part of originating end switch 14, communicates a database query message to FP database 24 via a data communications signaling link. In an example embodiment, the data link and other data links in the system 10 may be designed and used with common channel signaling system number seven (SS7) signaling, and database 24 may be incorporated with or closely associated with a local number portability (LNP) database. The LNP database may be any suitable storage element, such as a service control point (SCP) database.

A database query message may comprise two or more parameters. A first parameter may be the network address (e.g. the telephone number) of the originating telephone 617 234 5678, and another may be the dialed number that designates the destination TTY, 214 876 4321. In the case where the originator dials one or more prefix FP code(s), such as *338, such code(s) may also be transmitted to database 24. In an example embodiment, the dialed prefix codes may be transmitted in the form of additional parameters of the database query message. Alternatively, the dialed prefix codes may be transmitted via a separate message where appropriate. In each such case, the dialed prefix codes are identifiable either implicitly (because of their context) or explicitly (by use in a specific parameter, or when accompanied by another message parameter) as being for temporary use in the present call only. According to preferences established by the individual end user 12, and potentially stored in database 24, specifically dialed prefix FP codes may either supercede certain codes of the permanent FP codes or be suitably combined with the permanent FP codes during their temporary utilization.

In the example provided, the originating and destination end points may be located in distinct area codes and therefore, according to the North American PSTN dialing plan, the originator may dial the digit one, followed by the ten digits of the destination number. It is not required that the originating and destination end points be in different area codes or be served by different switches. For purposes of example, it is presumed that the appropriate data entries have been put into database 24 prior to making the call. In the case where there is no data record for a particular end user, or there is a data record storage space set aside but it does not contain any FP codes, a suitable default FP code or codes will be inferred from this absence of any explicit code. For example, the code 344 (described in the next paragraph) may be used in all such default cases.

The FP code 344 may indicate (for purposes of example) a voice network end point using the English language, and FP code 338 may indicate a TTY/TDD. The ten-digit data number such as 214 551 9876 may be the telephone number of an incoming trunk group associated with TRS switch 28. This may identify the preferred TRS center for network end point TTY 214 876 4321. The reasons for the preference may include the geographical location of TRS center 28, the end point in the same state, or reflect any other suitable relationship such as the subscriber's own personal preference if a plurality of competitive TRS choices are technologically and legally available to that subscriber. The other ten-digit number 617 873 5810 may have a corresponding identification for trunks of another TRS center that identifies the preferred TRS center for another TTY user.

A control processor and its associated software provided in database 24 may determine that the originating and destination network end points have technologically incompatible FP codes (344 and 338 respectively), thus implying that a direct connection may not be feasible. The SCP may return a query response message to originating end switch 14 that includes the appropriately identified and preferred TRS center number 214 551 9876. The originating end switch 14 may then establish a call in the PSTN. In an example embodiment, the call may be established using SS7 signaling.

The call setup process may continue with an initial address message (IAM), communicated by originating end switch 14 to its destination via an SS7 signaling link. The IAM may comprise three parameters: 1) the routing number 214 551 9876 of the preferred TRS switch 28; 2) the original dialed number 214 876 4321 associated with the destination TTY; and 3) the number 617 234 5678 of the originating telephone. The use of a fourth parameter in the IAM may also be included to indicate the proper configuration of CA element 30, although such may also equally be accomplished by use of distinct routing numbers for distinct CA element 30 configurations.

In the example provided in table 44, 214 551 9876 may be the network address of a trunk group in TRS switch 28. However, the choice of the TRS switch or center, and the particular trunk group therein that may be utilized at a call time may be determined by any one or more of several factors. For example, such a determining factor may be: 1) the area code and/or exchange code of the originator's number; 2) the area code and/or exchange code of the destination number; 3) a pre-subscribed TRS number pertinent to the originator; 4) a pre-subscribed TRS number pertinent to the destination such that, for example, a distinct TRS center may be used for interstate versus intrastate calls; 5) a TRS number selected on the basis of traffic quantity or reliability, such as a backup TRS center in place of an ordinarily preferred TRS center; 6) date and time of the call; or 7) any suitable combination of any of the previous factors, together with an algorithmic rule that resolves conflicts between two factors.

In response to the IAM and in accordance with the general principles of SS7 switching, transit switch 20 may route the call (possibly via intermediate switches not shown) to TRS switch 28, and/or to the particular incoming trunk groups of that switch designated by the routing number 214 551 9876. When TRS switch 28 is operating company property, the original dialed number and other parameters in the IAM may still be passed among the parameters in the IAM in SS7 format.

In another example embodiment of the present invention in which TRS switch 28 is a private branch exchange (PBX), the treatment of the Q.931 call setup message on a link may be modified to restore the information that was available in the IAM SS7 message. First, the call may be established so that it uses a trunk in the trunk group(s) assigned for the routing number. Second, a Q.931 message may be generated to include both the routing number (or a distinctive portion of it) and the dialed number (or a distinctive portion of it). Q.931 is a signaling protocol used for PBX equipment in contrast to SS7, which is used for public network equipment. Third, the originating number may be passed on this link regardless of whether or not the originating network end point subscriber has indicated that it should be suppressed. A further parameter may be included to indicate a CA element 30 position or configuration, which may be provided as an alternative to indicating such via use of a distinct routing number.

In such an operation, TRS switch 28 may be equipped with at least one CA position 30, or more where appropriate. The example of FIG. 1A comprises two extensions or internal network end point elements from TRS switch 28. One extension may be a voice network end point typically equipped with a headset (earphones and microphone) 36 to allow the human CA to hear and speak with his/her hands free. The other extension network end point may be equipped with a TTY 34. There may be other additional controls, plugs, sockets, switches, keyboards or other suitable elements (not illustrated) used to allow a CA the ability to execute his/her operations or to manually change the configuration and internal TRS switch equipment associated with a call.

When the voice call from the originating telephone 617 234 5678 is signaled by a call setup message being received by TRS switch 28, TRS switch 28 may perform a number of steps. First, it may originate a separate second link telephone call directed via an outgoing trunk link to the ultimate destination network end point 214 876 4321. The telephone number of this destination may be the dialed number parameter that is received by TRS switch 28 as a parameter of the call setup message. The originating line number of the caller 617 234 5678 may be transmitted as the caller identifier of the originator in this second link because it may be recognized by the person at the destination. This may be beneficial in many instances when the destination party has caller ID service. In a second step, the originator may receive (on the voice channel associated with the incoming call) one or more of the following audio signals: 1) silence; 2) the audio call progress tones (e.g., busy signal, ringing tone, etc.); 3) announcements returned to TRS switch 28 via the assigned voice channel in the communication link that is coupled in TRS switch 28 via appropriate voice channel connection(s); 4) audible call progress tones or audible recorded announcements generated at or by TRS switch 28 responsive to SS7, Q.931, or other suitable out of band signaling returned to TRS switch 28 by destination end switch 16 (or returned by other portions of the PSTN); or 5) audible call progress tones or audible recorded announcements generated at or by TRS switch 28 autonomously or responsive to a timer expiration or other event associated with TRS switch 28.

If a signal is returned from destination end switch 16, or from some other part of the PSTN, indicating that the TTY destination network point 214 876 4321 has answered the call, then TRS switch 28 may connect the voice channel coming from the originating network end point to the voice (headset) equipment 36 and separately connect the channel associated ultimately with the destination point 214 876 4321 to a TTY at TRS switch 28. In the example provided, there may be two call connections: one carrying voice and the other carrying TTY modem signals without audio signal coupled from one to the other. From this point forward, the CA does his or her job to briefly identify himself or herself via voice and/or keyboard, and then to interpret between the voice caller and the deaf TTY destination user.

If a signal is returned from destination switch 16 or from some other part of the PSTN indicating that the TTY user at destination network point 214 876 4321 has disconnected the call, or if a signal is returned from originating end switch 14 or from some other part of the PSTN indicating that the voice origination network point 15 617 234 5678 has disconnected the call, then TRS switch 28, may disconnect the channels associated with both ends. Alternatively, when the two end parties do not both disconnect at substantially the same time, TRS switch 28 may disconnect only the second link in response to disconnection supervision signals due to the destination TTY network point.

FIG. 1C is a simplified table 50 illustrating an example set of types of end users 12 and connections that may utilize communication system 10. Table. 50 may include an originator column 52, a destination column 54, and a TRS column 56. These elements reflect parameters or data segments that may be used in executing a communication session between end users 12 and 42. Table 50 may be used for purposes of illustrating an alternative embodiment to that described in the previous example. In the previous example, only one case of an ordinary deaf TTY user was offered. There are generally four distinct call configurations involving an ordinary deaf TTY user at one end and a hearing user at another end. Two of these configurations may involve TRS switch 28 in the connection. The other two configurations may be connected directly via the PSTN. The four cases are provided in table 50 for purposes of example and illustration.

The two cases that do not necessarily require a connection via TRS switch 2B may be identified when the originating end switch 14 communicates a database query to database 24. This may be indicated by the absence of a routing number in the database query reply, and/or by an explicit parameter in the reply. Either implementation may be used, but the latter may be desirable if the LNP database and FP database 24 are combined and, further, the result may be that both a TRS center and a recipient switch is identified, each via distinct routing numbers. An explicit indicative parameter may be desirable to clearly indicate that both LNP routing and TRS routing are used for the same call.

Although two cases in the above table both require a connection to be established via a TRS center, they differ regarding whether the originator versus the destination is the TTY user, which may affect the desired CA position configuration. It may be desirable in an example embodiment to indicate this unambiguously. This may be done by either or both of the following two methods. In a first example method, a separate code parameter may be returned by database 24. The separate parameter, or one derived from it, may be included in the IAM or the call setup message. This code parameter specifically indicates the functionality of the originator and of the destination line (for example: voice, TTY, or one of the other special cases described below such as voice carry over (VCO), hearing carry over (HCO), speech to speech (STS), two line VCO (2LVCO), etc.). The code(s) may be repetitions of the corresponding FP code(s) or may be distinct code values. In a second example method, a distinct and separate network address (telephone number) may be put into service at TRS switch 28 for each of the configurations. Each of the distinct network addresses may logically correspond to a distinct incoming trunk group. To apply this to a previous example, for the case in which the originator may be a voice line and the destination may be a TTY line, the network address 214 551 9876 may be used to direct the first leg of the call to TRS switch 28. In contrast, when the originator is a TTY and the destination is a voice line, another network address (for example, 214 551 9876) may be used instead. The second network address may refer to a logically distinct trunk or trunk group installed between transit switch 20 and TRS switch 28. As may be generally known, such a configuration does not necessarily imply installing more physical channels.

In order to establish the correct CA work position configuration when using the routing number network address method, TRS switch 28 is made "aware" of which of the two routing number network addresses is being used with the call incoming to TRS switch 28 to establish the first link connection. This may occur via one or both of the following processes. In a first process, the SS7 signaling associated with each incoming call may include a distinctive value in all or part of the routing number network address, e.g. the last few digits. That may be sufficient to distinguish which of the two alternative routing number network addresses was used to establish the particular call. In a separate process, telephone calls directed to TRS switch 28 using the second network address may enter via physically distinct channels. Their common channel signals may appear on a separate and distinct signaling link. In certain installations, both processes may be used concurrently.

Certain types of connections may require a compound type of translation of the call content. An example is a call involving both voice at one end with a TTY at the other, and simultaneously a translation of a human language such as Spanish at one end and English at the other. Similar compound translations of technological nature may be needed in a PSTN-Internet connection. In an alternative embodiment of the present invention, a data table may be maintained that is accessible to a corresponding TRS switch, or gateway switch, that indicates what translation capabilities exist at each CA position (or each path through a gateway switch in general). Another compound example is STS (in English) together with English-Spanish.

Database 24 may also be logically related to the data describing which CA positions are active and ready for use and which are idle (because the CA there is taking a coffee break from work, for example). Database 24 may be a doubly linked database in those cases where an individual CA may be seated at a different CA position in different sessions, indicating which capabilities are available at a particular CA position.

For a connection requiring compound translation, as in the Spanish-English voice-TTY example, the first pass for selecting a specific CA position to be used with a particular call may be to search database 24 or any other relevant database for a single CA who has the necessary two capabilities (i.e. Spanish-English translating capability and one that has a TTY at the CA work position). If this is not available at a single CA position, the processor associated with the CA position database may make a second pass seeking a CA with one capability (for example Spanish-English translation) and another who has the second desired capability (TTY to voice capability). An internal chain connection may then be set up in the TRS so that both CAs can participate in the connection. Extensions to a connection involving more than two translation CA positions or the chaining of different technological translation capabilities in a gateway switch in general may also be executed, connected in a chain of TRS or gateway switches. The data describing the CA having certain skills may be available at a TRS switch, stored in an internal database at the particular TRS, or alternatively all such information for all TRS switches can be provided in a master database (e.g. database 24).

FIG. 1D is a simplified table 70 illustrating an example set of additional types of communication impaired end users and noting the salient features of communication assistant configurations to be implemented or accommodated in communication system 10. Table 70 includes an identification column 72, a user description parameter 74, and a corresponding CA configuration category 76. In general each of these choices or options may necessitate a specific configuration at the CA position. The CA configurations may be indicated to TRS switch 28 via a distinct CA configuration parameter or by the use of a distinct routing number network address. The choices may be determined from a separate data table prepared in advance for each combination, or via an algorithmic process that matches each end subscriber properties to the necessary signal (voice or TTY or both) that must be conveyed in each direction. Each type of end user in table 70 may be identified by a distinct FP code in their data record in database 24.

Although some types of communication impairments may require the CA to hear speech from one of the two parties, it may be desirable that there be some type of voice communication capability available between both end parties in cases where there may be a need for an end party to make a request to the CA, or for the CA to make a request to an end party (such as asking that person to speak more slowly, for example). Accordingly, the CA configuration in table 70 reflects a minimum capability. (Additional connectivity may be optionally provided at a CA position as described in more detail below.) Connections involving one or more of these special types of communication-impaired subscribers may require a distinct configuration at the CA position. The correct configuration may depend on which type of communications impairment and technology is in use at each party's end of a conversation. Such a scenario may require the appropriate configuration and equipment at, or associated with, the CA position. Some combinations do not require involvement of the TRS center and thus there may be no corresponding CA position configuration. For example, a call involving a VCO person at one end and a HCO person at the other end can communicate via a direct PSTN telephone channel connection without the use of a TRS center. A call between an STS user at one end and a hearing-speaking person at the other end may require involvement of a TRS switch, and require the two links of the call to be connected to the CA via a voice conference bridge, but may not require the CA to use a TTY. A call involving a VCO user at one end and a hearing/speaking person at the other requires the CA to hear the speaking person. This does not, however, strictly require the CA to speak to that person. The CA could, in one minimal configuration, have only a TTY keyboard to communicate with the VCO user.

In order to exceed the minimum configuration, the configurations that do not strictly require voice communication with both end parties may be augmented in any number of ways. For example, a voice conference bridge may be configured for the entire duration of the call to permit the CA to communicate via voice to either end party. In another example, the CA may be given access at his/her position to control elements such as plugs, sockets, push buttons, a specialized use of an alphabetic keyboard, a graphic user interface, or any combination of these elements, to permit temporarily or permanently (for the duration of the call) establishing connections. The connections may be established via directional couplers and/or conference bridges to allow either (or both) voice or TTY communication with either or both end parties. A separate table or computer software algorithm may be appropriately implemented for each TRS center and may be used to determine the desired automatic CA position configuration that is responsive to each combination of user's needs at each end of the overall conversation.

There are also additional special CA skill requirements that may be invoked in some instances. For example, STS training, fluency in a non-majority language (e.g. Spanish in the United States), or an ability of the CA to translate between two specific end user languages may all be accommodated. The first of these examples may be needed for a conversation in which both end parties use the Spanish language, and the second may be needed when, in addition to providing the appropriate technological translation between a hearing and deaf end party, the CA may also be used to translate between two human languages. Communication system 10 can accommodate any such scenarios.

In one example scenario, the end parties may place appropriate FP codes in their respective data records in database 24 indicating a preference or requirement for a specific language, such as Spanish. Based on the particular combination of technological and human language requirements determined from the database records of the two end parties, the specific CA position configuration (and the choice of a CA with specific human language capabilities) may be conveyed via an explicit CA configuration code communicated to TRS switch 28 via a signaling link, or a trunk network routing address associated with call setup messages. Specific CA position requirements may be determined at database 24 or the originating end switch 14 from the FP codes of each end participant by using appropriate data tables or algorithms. TRS switch 28 may also refuse to connect the second link of a call if no CA is currently available that has a certain mandatory skill or knowledge needed for that desired connection. An appropriate announcement may be made in the form of (for example) audio or TTY text information communicated to the originator explaining the reason why a call may be refused at that particular time.

FIG. 2 is a simplified block diagram of one embodiment of communication system 10 and further illustrates an example 2LVCO interaction therein. A 2LVCO configuration may be distinct both internally and externally to the TRS in that it uses two lines on one side of the TRS. The embodiment of FIG. 2 may be inclusive of a conference bridge 60 that facilitates communications between transit switch 20 and TRS switch 28. A person who can speak but not hear may be a candidate for either VCO or 2LVCO services. The CA configuration for a VCO subscriber may allow the VCO subscriber's voice to flow through the CA position configuration to the hearing person at the other end of the connections (via conference bridge 60). The CA does not need to repeat or to type data relating to the speech of the VCO (or a 2LVCO) subscriber. For communication in the opposite direction with a VCO configuration, the CA may wait for the hearing person to finish speaking a phrase and then type those words so that they appear in text on the VCO subscriber's TTY or display. Continuous speech and TTY modem tones generally cannot coexist simultaneously on the same channel. Each TTY keystroke generates a modem burst that would prevent hearing simultaneous speech. A 2LVCO connection may allow the CA to type the words spoken by the hearing person simultaneously or almost immediately as they are spoken, and the TTY modem tones may convey this-typed text to the 2LVCO subscriber's TTY display. These tones do not prevent simultaneous speech by the hearing person because speech does not appear on the same channel.

In operation, a call may be originated by a hearing 30 originator at the network end point having telephone number 214 545 6545. The PSTN network configuration is shown in a simplified form for purposes of teaching:

several intermediate voice and packet switches that are not shown may be involved in such a connection in a network. When the call is dialed, the originating end switch 16 may use a data link to query database 24, communicating the two parameters 214 545 5645 (namely the originating network point telephone number) and 617 234 9877 (the dialed number) in the query message. By examining- the appropriate data records, the processor associated with database 24 determines that the destination may be a 2LVCO subscriber and the originator may be a voice subscriber. A reply message may be returned to originating end switch 1G comprising at least the routing number appropriate for TRS switch 20.

The originating end switch 16 may then communicate an IAM to TRS switch 20 via a corresponding data link using similar details of operation to those described in the previous example. This IAM message may comprise both destination numbers 617 234 9877 and 617 234 9876, or alternatively it may comprise one of them, and the other may be derived as described below. TRS switch 20 may then use the dialed number 617 234 9877 to initiate a second link and a third link connection between TRS switch 20 and destination TTY 617 234 9877 and telephone 617 234 9876 respectively. The CA position equipment may be not yet connected to this call. If and when the TTY 617 234 9877 and/or telephone 617 234 9876 answer(s), the CA equipment may be connected and configured appropriately. Also, the audio channels of the two end telephones 212 545 6545 and 617 234 9876 may be connected to each other and to the CA headset 36 via conference bridge 60. TTY 34 at the CA position may be connected to end subscriber TTY 617 234 9877 via TRS switch 28 and transit switch 20. From this point forward in the communication session the CA may type into TTY 34 the text form of the words spoken by the hearing participant located at end telephone 214 565 6545. Although the CA can hear the words spoken by the deaf participant, the CA need not type these words and may only respond to that person when a statement or question is addressed to the CA.

The directory number used by the 2LVCO subscriber may be that of the voice telephone or the TTY, at the discretion of the subscriber himself/herself. The directory number may be the one that is made known to potential correspondents and may be the number that others may dial to reach the 2LVCO subscriber. The term "directory number" does not necessarily imply that this number be published in any directory (via any suitable media). The other line may utilize a non-published dialable number or a non-dialable pseudo-number where appropriate. The establishment of the second parallel link may be executed in the case of a call for which the 2LVCO subscriber is the destination. The second parallel link may be connected as a result of a call initiated by TRS switch 28 or, alternatively, a call initiated by the 2LVCO end subscriber or equipment at his/her location. Where the 2LVCO subscriber initiates the overall call, the 2LVCO subscriber (or some automatic dialing equipment associated with the telephone and TTY at that subscriber's premises) is permitted to initiate both connections. In an example embodiment, the 2LVCO subscriber can dial the voice destination number 214 545 6545 from the dial of the TTY line 617 234 9877. Communication system 10 may recognize that this call originated from a 2LVCO subscriber, and may route it via TRS switch 20. Then the 2LVCO subscriber can dial the same destination number 214 545 6545 from the dial of the voice line 617 234 9876. Database 24 may recognize that this may be a second line call needed to make up a 2LVCO connection together with another line already in use. The reply from database 24 to originating end switch 14 (in this example) can specify that the connection appropriate for this call may connect to TRS switch 20.

Regardless of whether the 2LVCO subscriber or the subscriber at the other end initiates the call, the second parallel link may be automatically set up. The item of information that may be recognized by TRS switch 28 or end switch 14 may be the network address (telephone number) of the second line at the 2LVCO subscriber location. The setup of a call having the destination may be designed and implemented appropriately. The second line number may be made known to TRS switch 28 and the second parallel connection established by any suitable method. As one example, a database (such as database 24, but not restricted thereto) may contain a cross-index of number pairs used as part of a 2LVCO installation. As another example, a database (such as but not restricted to database 24), could be used to merely indicate that a particular line is a member of a 2LVCO installation, leaving the determination of the second line number to further step. A code parameter indicating that a particular number is a member of a 2LVCO installation, again leaving the determination of the second line number to a further step. As an example of such a further step, the first and second line telephone numbers of the two relevant lines at the 2LVCO subscriber's premises may have a known premeditated numerical relationship to each other. The two numbers may differ only in their final digit, and the voice line may be the smaller number. Many other premeditated number or pseudo-number relationships may be used as well.

The first and second line telephone numbers of the two relevant lines may each be assigned numbers such that one may be a dialable decimal number and the other may be a non-dialable pseudo-number, whereby the two numbers are related in a predetermined way (such as having the same last 4 digits but different exchange or central office codes). The non-published number may be linked to the published dialable number in any appropriate way in database 24, indicating by an appropriate FP code that it may be the second line in a 2LVCO line pair. This number may be returned in response to a database query as a parameter, the parameter being carried in any appropriate messages (for example, the IAM) and therefore becoming known to the switch that needs it for purposes of establishing the second parallel link. When the call is initiated by the 2LVCO subscriber, that originating end switch may then establish a "double header" connection, linking two ends of the second link, both originated by that switch with one end directed to a second line (617 234 9877) and the other end directed to the appropriate routing number associated with TRS switch 20.

FIG. 3 is a simplified block diagram illustrating an alternative embodiment of communication system 10 that offers an example of connections between disparate networks (e.g. PSTN and Internet). FIG. 3 may include a gateway switch 84 (that delineates between a PSTN side and an Internet side), an ancillary database 88, and an electronic interfacing element 90 that may include a microphone and a speaker. The embodiment of FIG. 3 may be illustrative of a typical connection between a PSTN voice caller (end user 12) at one end and an intermediate gateway switch 84 interposed in the middle of the path. A voice over internet protocol (VoIP) Internet end user making use of electronic interfacing element 90 may be provided at the other end. Gateway switch 84 may include both circuit-switching (compatible with the PSTN) and Internet packet switching capabilities. Gateway switch 84 may also contain one or more conversion elements or transcoders to convert between the audio coding digital information used respectively in the PSTN and Internet VoIP systems. Gateway switch 84 may further contain one or more processors and appropriate signaling interfaces to both the PSTN and the Internet such that it may be capable of mapping logically corresponding sequences of call processing messages between the PSTN and the Internet.

In operation, a call setup originated by a caller may be initiated by implementing the following steps. Before the call is attempted, the destination internet terminal (electronic interfacing element 90) may have been assigned an Internet network address, which may be numeric, alphabetic, or a combination of both. The Internet address may be stored in the appropriate record of database 24 and may also be stored in other databases as well. The location of its storage may be logically linked to a PSTN number that may be owned by that destination subscriber. The subscriber may be identifiable in relation to a telephone number that may be dialed from a telephone dial from within the PSTN. This does not necessarily imply that this destination person also has a conventional telephone network end point installed in the PSTN. The destination person may be the sole human user of this dialable telephone number, or he/she may share that number with other members of a family or work group.

The dialable destination telephone number may be associated with a plurality of PSTN and/or Internet network end points in FP database 24. At least one data record in FP database 24 may be assigned to the destination network end point (i.e. electronic interfacing element 90). For this example, its FP data field comprises at least one FP code indicating that it may be an Internet VoIP terminal. The network address used to index or to locate the data record within database 24 may be either the dialable directory decimal telephone number of the subscriber or it may be a different number (preferably a non-dialable pseudo-number) provided that there is an appropriate logical linkage in database 24.

Another data entry in this record may be the Internet address appropriate for reaching the destination end point. This may be an alphabetic symbolic network address of the form destination.person@destinationdevice.domain where the words "destinationdevice.domain" at the end of the address may also be alternately expressed for human perception by a string of numeric digits and decimal points (full stops). The address -may comprise the dialable or non-dialable number used in the PSTN for the corresponding destination person.

The originating caller may be connected to the Internet terminal of the destination party as a result of either an FP code used by the originator to indicate that Internet destination may be preferred, or by the information previously placed in database 24 by the destination party (or other authorized person), which ultimately causes a connection to that destination regardless of the specific intent of the originator.

When the originator desires the Internet destination (in preference to other logically consistent but distinct physical destinations for that destination party), the originator may either place the appropriate FP code (signifying that the Internet destination may be preferred or desired) in the originator's own FP database record prior to making the call, or dial a corresponding FP prefix or prefixes. When the destination party seeks to receive all incoming voice telephone calls at the Internet data terminal, an appropriate indicative FP code (e.g. signifying to deliver all voice calls to a VoIP destination) may be put into FP database 24 records. When either (or both) of these elements may be in place, the originator may dial the dialable decimal directory number of the destination party (with or without the dialed prefix requesting Internet destination), and the originating end switch 14 may issue a database query to database 24. As a result of the comparison of the FP codes relevant to the originating network point, and the FP codes associated with the destination party's various network points, the processor associated with database 24 may return a response that includes: 1) a routing number that. may direct the connection to a trunk group of gateway switch 84; 2) the originating network point's number; and 3) the dialed number. These parameters may be communicated in an IAM or another call setup message sent by end switch 14 and received by gateway switch 84.

A call may be established between the originating end switch 14 and gateway switch 84. Gateway switch 84 may then use this information to attempt to establish an Internet connection, which represents a path through the Internet. In embodiments in which the destination Internet address is not explicitly passed to gateway switch 84 via the call setup message communicated from originating end switch 14, gateway switch 84 may use the dialed number, and other relevant data, to determine the destination Internet address from either (potentially pre-established) ancillary database 88 or via a separate query to database 24. Ancillary database 88 may have a different structure and may be devoted, among other purposes, to mapping E.164 format telephone numbers into Internet addresses and the reverse. Such call 'setup attempts and other Internet call processing may be conducted using one or more of the call processing protocols (e.g. H.323, SIP, Magaco, etc.) as may be available or preferred in the relevant Internet installation. According to the status of the destination (not in service, busy, ringing, alerting, etc.) gateway switch 84 may communicate appropriate signals and/or audible call progress tones or recordings back to the originator. If and when the destination user accepts the connection, appropriate signals may be sent from the Internet network destination (electronic interfacing element 90) to gateway switch 84, causing a voice connection via the appropriate voice channel.

A call may also be established in the opposite direction, originated by the previous example destination and directed toward the previous example originator. The network address used by the Internet point to originate the call request to the PSTN end point may be either an alphabetic name or a number conforming to E.164 standard. Translation between such a non-E.164 address format and an E.164 format may be accomplished via data contained in ancillary database 88 associated with gateway switch 84, or from database 24, or any other appropriate database (s) accessible to gateway switch 84. The Internet point may have a distinct record in database 24 or ancillary database 88. The FP codes, when compared with the destination FP codes, may cause the call setup directed to the PSTN to go to a different end point, or to include an intermediate switch such as a TRS switch.

It is important to recognize that in the context of the embodiment of FIG. 3 or in any of the embodiments of communication system 10, two or more human CAs may be suitably chained together to facilitate or to effectuate any communication session. (In this example we describe CAs, but the same teachings are equally applicable to non-human translator devices, or to a combination of human CAs and non-human devices.) The chaining may involve more than one TRS center (or more than one gateway switch) in order to chain the correct translation skills available only at certain TRS centers or gateways. The skills or capabilities (e.g. STS training or Spanish language capability) of each individual CA who is on duty at a particular time (and indications as to when that person takes a short time break from work or moves to another desk) may be accounted for in any embodiment. Using that data list, and an internal data list indicating previously known requirements indexed by the telephone number of the caller (for example, the person at 214 665 4321 requires a Spanish-English interpreter) a single optimal CA may be automatically selected for a call involving that person. Accordingly, chaining two or more CAs in a TRS switch (or translator or signal converter devices in general) may be implemented to achieve a compound service (e.g. STS to English/Spanish to TTY, etc.). Thus, the automatic chaining of CAs or electronic translators that are resident in different TRS or gateway switches may be implemented. In the previous chain of STS-English/Spanish-TTY, the first TRS may have an STS person ready at call time but lack a Spanish/English-TTY person. The first TRS may chain in a second CA at another TRS center by originating a link directed to the same destination person as dialed by the originator but with a (temporarily) different type of FP code. The real originator FP code(s) may indicate that the originator required STS. The destination FP code may indicate that the destination person is deaf and speaks only Spanish. The first TRS center may have an English-only STS CA ready to work, but not be provided with an English-Spanish interpreter. The first TRS may originate a second call by automatically dialing a further link directed to the destination number and substituting codes indicating only that the apparent originator speaks normally (the STS code being temporarily suppressed because the first TRS center has interposed a STS expert who produces standard spoken English output).

The destination user may still need an English/Spanish translation and TTY so the communication system 10 may initialize a further link. If the real-time capabilities of various TRS switches are known to database 24, it may search for a particular TRS center having such English/Spanish and TTY capabilities. Alternatively, if real time capabilities are not known, then database 24 may seek out a different TRS center than the one already being used. In general, such a call may have three or more links rather than the two links for a all where all the translations occur in the same TRS center. Additionally, a call in which three translators are needed, and the first and third translators are both available in a first TRS center and the intermediate CA translator is only available in a second TRS center, the call may go from originator to the first TRS, from the first TRS to the second TRS, the second TRS back to the first TRS (using a different CA or translator device this time through), and from the first TRS to the ultimate destination.

In an example implementation of chained CAs from different TRSs or gateway switches, there may be a master database indicating which CA translation capabilities are available at each and every TRS center on a real-time basis so the call is more likely to go through with all the various chained translation steps operable. This would be accessible by database 24 when it routes a call (even a single-step call like STS) to a particular TRS center. If the particular database is available to all the TRS centers, it may allow each TRS center to choose a continuation chained TRS center for a chained-translation call based on passing the call to a TRS center that has a CA with the proper skills and is available at that time. In the absence of a master database, the chained connection may still be established; but not with the same level of certainty that each CA is available before extending the next link of the chain.

Figure 4:
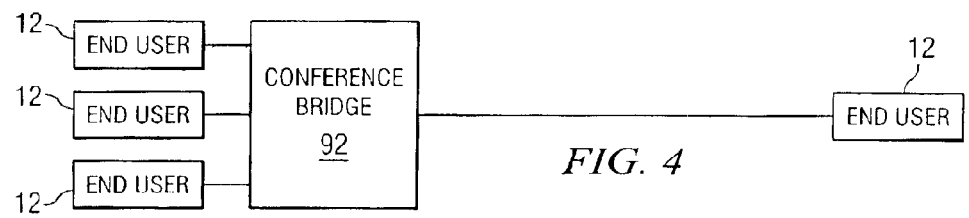
FIG. 4 is a simplified block diagram illustrating yet another alternative embodiment of the communication system.

FIG. 4 is a simplified block diagram illustrating yet another alternative embodiment of communication system 10 that may include a conference bridge 92. The embodiment of FIG. 4 illustrates a more efficient connection of a conference call connecting four end parties 12, the first three of which are similarly geographically situated and one being geographically situated far from the first three. To achieve this more efficient connection, there may first be a choice of one or more conference bridge locations available. Only the one finally chosen, conference bridge 92, is illustrated for purposes of teaching. (An alternative conference bridge may be located on the right side of FIG. 4, but may be an inferior choice because longer links would be needed from it to each of the three end users at the left side of FIG. 4.) There may also be an algorithm that permits identification of the optimal or near-optimal. choice(s) of a particular conference bridge or bridges given a substantially accurate description of the given location or other relevant properties of the various end parties. The choice of the optimal conference bridge location may be determined by finding a combination of network connections or links having a minimum total "cost." The total cost may be comprised of individual cost elements for various individual network links from individual telephones to individual conference bridge ports. For example, the cost may be the billing cost to a subscriber for the use of each particular network channel path. In other cases, the cost may be a theoretically calculated cost figure and not necessarily representative of the true capital cost or operational cost. The cost may also involve certain measured or predicted factors that are not really dollar costs, such as an artificial cost factor added in for channel link paths that are known or expected to be heavily traffic loaded at the time of the conference (thus indirectly providing a preference in the form of lower cost to less congested paths in the network). In certain cases, links may have a different cost because they are the property of the same network service provider who provides the conference bridge and associated switches.

For purposes of teaching, two types of conference call setup processes are described. In one type, the conference call may be pre-arranged. The list of intended participants may be known at or before the time the conference call is initiated. In contrast, in a second type of conference connection ("incremental"), the various participants may not be known with substantial completeness before the call is initiated. Individual participants may join and leave the conference connection from time to time.

For a pre-arranged conference, the optimal choice of one (or of a plurality of interconnected) conference bridge(s) may be determined at or before the time the conference call is initiated. A descriptive data list may also be maintained that describes each available conference bridge, its associated capacity (number of ports), and a network access routing code for each conference bridge within each such switch. In an example embodiment of the invention, such network access routing codes may be non-dialable pseudonumbers. For each distinct conference call, a substantially complete list of planned participants may be made known to the cost calculation computer at the appropriate time. Such a list of numbers may be alternatively entered via a telephone dial using a telephone network connection to the cost calculation computer. The controlling participant or controlling subscriber among this list of proposed participants may be made known via its list order (for example, the first number in the list) or may be identified in other suitable ways generally known. Although the identity of the controlling participant may not always be relevant to the cost calculation, it may be used in the conference process for other reasons or purposes. Optionally this system may also accept time window input data comprising the earliest time (and date) and the latest time (and date) that the relevant conference call may be permitted to occur. The cost database may be continually maintained in an up-to-date accurate status via the activities of a support staff or system having appropriate technical access. The cost database may be usable for a variety of different end users having business and technologically permitted access to the same conference bridges.

The determination of the minimum cost configuration may be carried out by the cost calculation computer (not illustrated in the figures). The process used to select the optimal conference bridge(s) may include: a) a complete or exhaustive evaluation of all possible link choices between each end participant telephone and a conference bridge port for every individual conference bridge choice and for every combination of multiple conference bridge combinations; b) a process for more rapid evaluation and identification of the optimum choice of conference bridge(s) and links, using a mathematical process such as linear programming, method of gradients, simplex method, interior point method, or any other optimization methods; and c) any suitable combination of a and b above.

Figure 5:
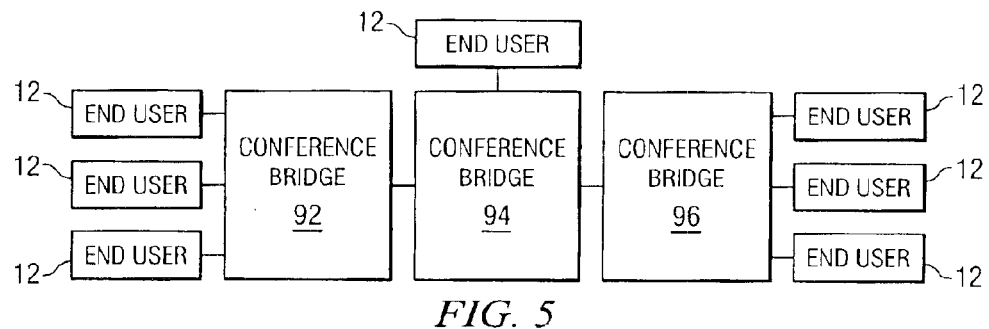
FIG. 5 is a simplified block diagram illustrating still another alternative embodiment of the communication system.

FIG. 5 is a simplified block diagram illustrating still another alternative embodiment of communication system 10. The embodiment of FIG. 5 illustrates an example of an optimal conference connection using three conference bridges 92, 94, 96. The conference bridges may all be resident in the same switch, or they may be distributed among distinct different switches (the switches are not illustrated in FIGS. 4 and 5). Bridge 92 may include four ports, one of which may be connected to a second bridge 94 via a corresponding channel. The other three ports may be connected to telephone network end points (i.e. end users 12). Conference bridge 94 may include three ports. Two ports may be connected to a telephone network end point, and one port to a corresponding channel. The channel may be connected at the other end to one port of conference bridge 96, which may be a four-port bridge. The remaining three ports may be connected to telephone network end points. In the case where this overall conference is established by each telephone network end point participant dialing an access number in order to become connected, as many as three distinct routing numbers may be used by the telephone network end points that are connected to the three distinct conference bridges (and the switches associated with each such conference bridge).

The result of the optimum choice in the cost calculation computer process(es) may be a list or set of data comprising a routing number for each proposed participant. In the example embodiment of FIG. 5, at least three distinct routing numbers may be used. In certain cases, a single switch may support more than one. conference bridge (and thus also more than one simultaneous conference as well) and that switch may be assigned more than one destination routing number, one for each conference bridge therein. The list of data may then be made known to FP database 24 via an appropriate data communication, and may be linked to or reside in the relevant data record for a pre-designated conference access number. An FP code may be automatically placed in a database 24 data record for the conference access number, the FP code indicating that this is a conference access number related to a list of specific routing numbers for each specific participant.

For this particular sub-type of pre-arranged conference call, each of the seven participants may gain appropriate access to the conference by each dialing the same conference access number. Use of only one access number for a conference service provided in this way may be desirable because it may be convenient and easier to remember one dialable access number for all conference purposes used by a particular set of subscribers or clientele, rather than distinct access numbers for separate conferences or for separate participants among such a set of subscribers. When a participant dials the pre-designated access number, the originating switch may communicate a database query message to a database, such as database 24 for example. The processor associated with database 24 may respond to the FP code in the data record for the conference access number by examining the associated list of data elements and selecting the routing number that matches the telephone number of the particular originating caller. The routing number may be returned to the originating switch in the query reply message. If the originating caller's number is not in the list for that particular conference call, FP database 24 may not return a routing number, but instead may return a parameter indicating explicitly that, or by the absence of a routing number indicate that participation by that particular caller in that particular conference call may not be permitted at that time.

Database 24 may also communicate autonomous messages to the switches associated with the plurality of conference bridges. In relation to the embodiment of FIG. 5 there are three such switches (not explicitly shown), each one being associated respectively with conference bridges 92, 94 and 96. Database 24 may communicate two separate unsolicited messages to, for example, the two switches associated with conference bridges 92 and 94 respectively. The message type may cause each such switch to autonomously originate a call to another switch. The originating end of this call channel may be one of the ports on the relevant internal conference bridge of that switch, as identified by a parameter in the message. The destination of the call may be on another switch having an internal conference bridge. The routing number for this call may be the conference access routing number associated with that internal conference bridge. It may be another of the parameters in the autonomous message from FP database 24. The call setup message used to establish this particular link from the switch associated with conference bridge 92 to the switch associated with conference bridge 94 may also contain a parameter indicating that this link should be automatically disconnected as a result of all other ports of the relevant conference bridge being disconnected. The purpose of this may be to ensure that manual or clock-driven disconnection of other ports eventually leads to the disconnection of all temporary conference links.

There may be also a second sub-type of pre-arranged conference call that may be generated by automatic outward-dialed connections from each switch that may be associated with one of the chosen conference bridges. Such outward calls may be set up for each participant who answers. Potential participants who do not answer within a pre-designated time interval, or participants whose line may be busy when called, are not connected to the conference bridge and their call may be abandoned. The outward calls may be initiated in response to a designated controlling participant dialing the conference access number, or alternatively by a clock.

When it is prepared, the list of conference-participant-to-conference-access-routing-number pairs may be made accessible to database 24 and its control computer or to another appropriate computer having access to the relevant signaling network, e.g. SS7. When the conference is initiated by either the controlling participant or the appropriate clock time, database 24 may communicate two types of autonomous messages to the switches that contain the designated conference bridges. One type of message may be substantially the same as previously described for the purpose of establishing channels between the various designated conference bridges. The other messages, one for each potential participant (except for the controlling participant in a system set up to initiate the conference in response to his/her call), may be sent to the appropriate switch containing a designated conference bridge. The message may comprise any one or more of three parameters: 1) a code parameter indicating that this message may cause an outward going call between a port on the designated internal conference bridge and the designated conference participant's telephone; 2) the designated participant's telephone number; and 3) a parameter designating a particular conference bridge in that switch (a parameter that may be needed when that switch contains more than one appropriate conference bridge) . Less than all three parameters may be used, thus implying use of a default value for the remaining unspecified parameters. The message, and the outgoing call that occurs in response to it at the designated switch, may be similar to the corresponding outgoing call from switch to switch because one end may be a port on the originating switch. Each such call attempt may be automatically abandoned after a pre-designated ring-no-answer time interval, or if the destination telephone line may be busy.

Figure 6A:
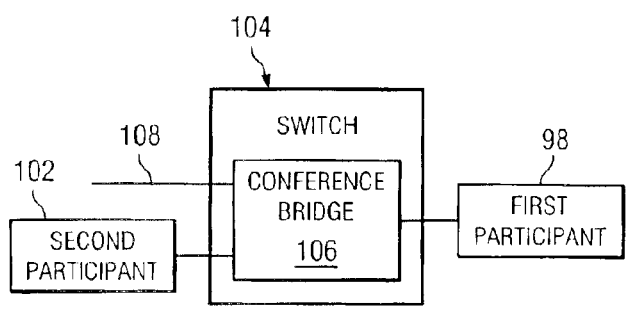
FIGS. 6A–C are simplified block diagrams that illustrate an example interaction associated with the communication system.
Figure 6B:
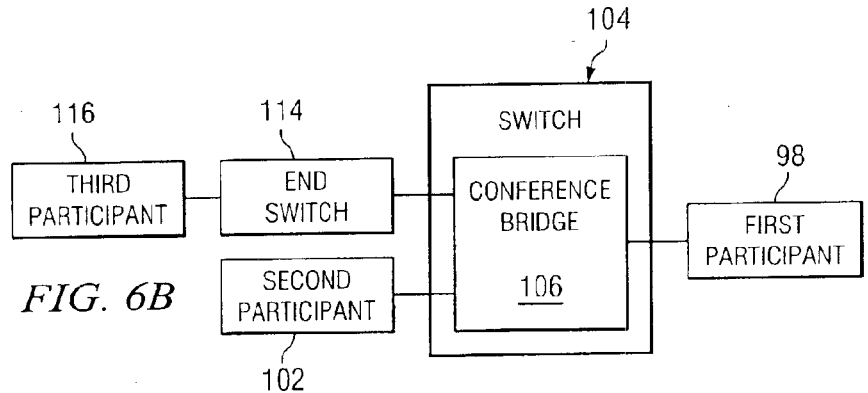
Figure 6C:
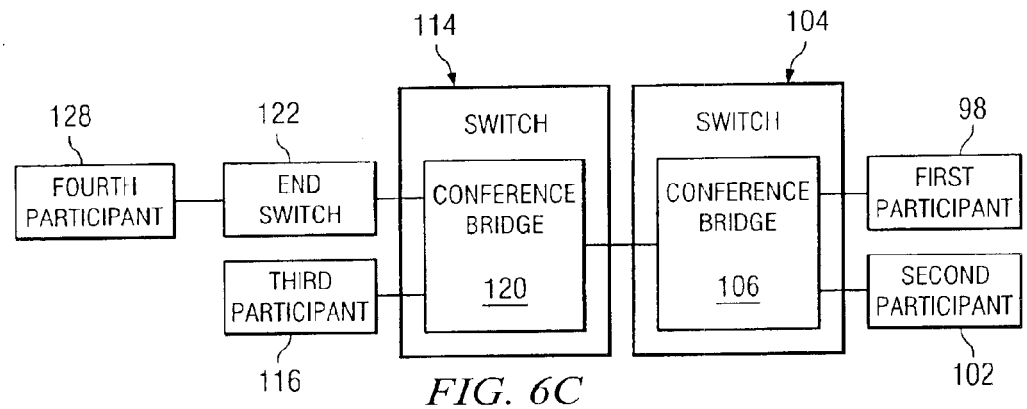

FIGS. 6A–C are simplified block diagrams that illustrate example interactions associated with communication system 10. The embodiments reflected in FIGS. 6A–C reflect the other main type of conference call that may be accommodated by communication system 10 (i.e. an incremental conference call). It may be distinguished from the pre-arranged type partly because the list of participants may be not known in advance and these participants may each voluntarily initiate the access process by dialing a dialable access number for the conference. A list of permissible participants may be used optionally, but that list may identify many potential participants who do not participate in a particular conference call, and may be used here only for access permission control and not to determine the optimal choice of conference bridge(s).

In the example provided in FIG. 6A, a first step is illustrated in the process in which a connection is established by a first participant (caller) 98 in an incremental conference call. First participant 98 may be served by a switch 104 that contains a conference bridge 106. A second telephone network end point (second participant 102), may be connected to the first end point via the internal switching structure or fabric of switch 104 and via respective ports of the internal conference bridge 106. This configuration may allow additional participants to participate in a conference or broadcast call.

The configuration of FIG. 6A may arise from more than one starting point. For example, first participant 98 may be always connected to others via a conference bridge (such as conference bridge 106) whenever it initiates or receives a call. This situation may be installed in switch 104 by a software modification for any suitable reason, such as, for example: 1) first participant 98 may be a recorded announcement machine presenting weather or traffic information; or 2) first participant 98 may be the moderator of a chat room.

The configuration of FIG. 6A may also be temporary. For example, at an earlier time the first and second participants 98 and 102 were connected in a conversation via switch 104 without the use of conference bridge 10 6. Two events may trigger the configuration FIG. 6A. In a first event, first or second participant 98 and 102 may make a signal to switch 104 (for example, a momentary depression of the cradle switch and a dialed code) to cause a reconfiguration of the connection. In a second event, a third participant may dial the telephone number of first participant 98 and then certain subsequent events may occur as described below.

An FP code may be placed in the relevant data record of database 24 describing that first participant 98 is or is not associated with an open conference bridge. The FP code may further indicate whether first participant 98 can accept other callers, even when first participant 98 is already engaged in a conversation. In addition to the FP code in database 24, a list of conference bridges that carry some part of the conference connection may be constructed and stored in an appropriate way in database 24 (or other accessible database (s)), either in the data record for the first participant or linked thereto. At this point in the process, there may be only one entry in that list. Each such conference bridge may be represented in the list by a network routing code appropriate to the particular conference bridge and the switch in which it resides. The only entry at this stage may be a network routing code that may route a call to the unused third port on conference bridge 106, provided that conference bridge 106 is in place. In an example embodiment of the present invention, such network routing codes describing conference bridge ports are non-dialable pseudo-numbers (note that the terms 'number' and 'pseudo-number' may be used interchangeably herein in this document). Pseudo-numbers do not accelerate the exhaustion of the limited stock of decimal dialable numbers and may also prevent access by unauthorized persons and inadvertent busy signals on certain lines. The network access code describing the port may be transmitted via a data message from switch 104 to database 24 in order to construct the list. Conference bridge 106 need not be connected to first and second participants 98 and 102 in advance of specifying the corresponding port as the connection point for another participant.

A larger, more robust conference bridge having more than three ports may be used or connected inside switch 104 to support more than one available network access port. The same network access number may be used on this switch for a plurality of conference bridge ports on the same conference bridge. Given the scenario of FIG. 6A, a third participant 116 can voluntarily join in a conference with the first and second participant as illustrated in FIG. 6B. When third participant 116 dials the number of first participant 98, end switch 114 communicates a database query message to database 24. Examination of the data record describing first participant 98 in database 24 discloses that it may be an open conference bridge in the example embodiment. Examination of the associated list discloses that there may be only one network access number in the list. The network access number may be returned to end switch 114 and may be used in a call setup to connect third participant 116 to a conference bridge. Access ports for conference bridges may answer automatically when called and connect the incoming channel to the next available port of the conference bridge. In addition to that, end switch 114 may communicate a message to database 24 that includes a network access number for an available port on an unused conference bridge. The network access number may be appended to the list.

A conference bridge 120, not illustrated in FIG. 6B because it may not be used yet in the conference setup process, is represented in FIG. 6C. Conference bridge 120, within end switch 114, may be invoked in order to facilitate the conversation between the existing parties and a fourth participant 128 and others not illustrated. Fourth participant 128 may seek to join the conference and dial the number of first participant 98. End switch 114 may communicate a query message to database 24. From the FP code in the data record and the list of (two) network access numbers, the control processor may invoke the cost calculation computer to determine which of the two conference bridges (and their resident switches 104 and 114) is closest to fourth participant 128. The FP database control processor may invoke the cost calculation computer to find which of the two switches is the lowest cost place to connect fourth participant 128. End switch 122 may subsequently connect fifth participant 128 to a port on end switch 114 as a result when it is chosen by the cost calculation computer. Switch 122 may also add another network access number to the list of such numbers in the cost calculation computer, producing three entries in that list. The cost calculation computer may chose to attach the latest participant to a conference bridge on the same switch as the participant as well, although this is not explicitly illustrated.

Figure 7:
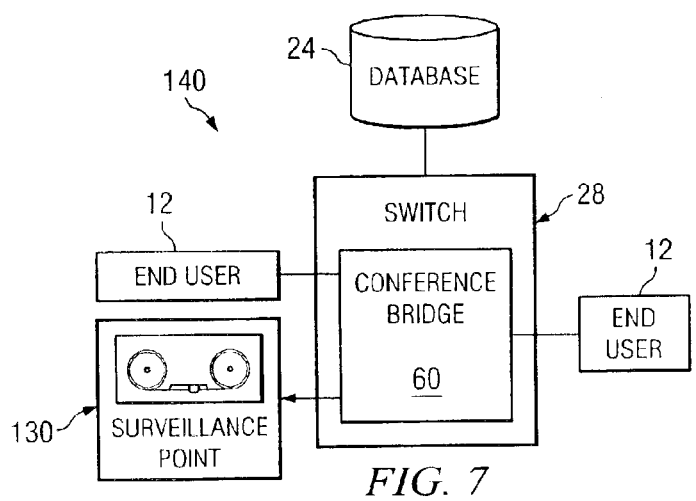
FIG. 7 is a simplified block diagram illustrating yet another alternative embodiment associated with the communication system.

FIG. 7 is a simplified block diagram illustrating yet another alternative embodiment associated with communication system 10. The embodiment of FIG. 7 reflects a modification of FIG. 1A in which transit switch 20 is not illustrated for purposes of clarity. Additionally, the embodiment of FIG. 7 may include a surveillance point 130 in an example arrangement. Surveillance of outgoing and incoming calls of a subject may be desired in any number of cases. For example, in one case an end user 12 of certain telephones may be the subject of an order from a court authorizing a wiretap, a bugging, or a call trace. Recognizing that criminal suspects often purposely use a variety of borrowed or public telephones to evade such wiretapping, a court may issue an order that permits wiretaps or traces on any telephone used by the targeted subject.

Another reason for surveillance may be a desire by the subject, himself or herself, to record all telephone conversations in order to provide a written record or archive of conversations (e.g. as proof of a business commitments made to others). In such a case, the subject may normally not be evasive and may repeatedly use the same telephone to make and receive calls without any attempt to evade surveillance. The embodiment of FIG. 7 allows the automatic inclusion of conference bridge 60 at the originating switch of every call involving the subject in either case.

A specific FP code and network surveillance point telephone number may be placed in the data record of database 24 for either the originating or destination telephone prior to the completion of dialing a call involving either telephone.

The FP code may indicate that the origin and destination telephone numbers describing this call are to be stored in database 24 for later retrieval (thus executing a trace), and also the originating switch may include a conference bridge in the voice connection. The third port of conference bridge 60 may be automatically connected via an autonomous outgoing call to a network surveillance point telephone number, which may stay connected for the duration of the conversation.

In an example embodiment, the channel connected from conference bridge 60 to surveillance point 130 may be a four-wire element. Such an element may prevent or minimize echo or other sounds that would reveal the existence of surveillance to the subject. other configurations may be readily implemented in accordance with particular needs. The network surveillance point telephone number may be a non-dialable pseudo-number for security and may be used to help prevent an accidental or unintentional busy condition at that surveillance point. If the targeted surveillance subject frequently moves from one telephone to another, the subject may be observed and other information available from other sources regarding the telephone number(s) of telephones (landline or cellular) in the vicinity may be utilized to enter the appropriate FP code(s). The surveillance network destination in the appropriate database record for that telephone number may be provided as long as the subject is likely to make use of it. For example, law enforcement agents have use of maps listing the telephone numbers of all public coin telephones in certain areas, which may be used for this purpose.

If the subject dials a call from a telephone having an unknown telephone number, an effort may be made to visually or otherwise observe the dialed number and to enter the appropriate FP code and number into the data record in database 24 before, or contemporaneous with, the dialing of the final digit by the subject. For the purpose of entering the FP code in the correct database record before the subject dials the last digit, the system may be programmed to respond to all but the last digit entered by the observer in the following way: all ten choices for the last yet unknown digit are used to select ten data records in the FP data base in which to place codes causing an automatic surveillance connection. Similarly, other alternative embodiments of this method may use 100 lines when the last two digits are not known, or 1000 lines used when three digits are not known, and so forth. Numbers that are selected in this way, or designated because they are the telephone numbers in the vicinity that the subject is likely to use are "guessed" numbers. Surveillance FP codes may be automatically removed from the data records of such guessed numbers after a designated time interval to prevent false surveillance.

Regarding the potential surveillance of remaining guessed telephone numbers that do engage in a call starting at approximately the correct time, all of these elements may be observed and/or recorded so that all such recorded conversations may be examined by a person legally authorized to identify whether the subject may be a participant in a particular call. Recordings or other surveillance information identified in this manner as not involving the correct subject may be erased or discarded. To facilitate recording of multiple simultaneous conversations, the surveillance point may be equipped with sufficient multiple simultaneous recording equipment, and the network surveillance number may be installed as the lead line number of a "hunt group" of destination channel appearances at surveillance point 130. Alternatively, separate network surveillance numbers may be used for different (guessed) dialed telephone numbers. In these ways, several simultaneous conversations may be recorded.

In operation of an example embodiment of a surveillance application of communication system 10, an originating caller (end user 12) being served by switch 28, may initiate a call. Switch 28 may communicate a database query message to database 24, the query message comprising both the dialed number and the originating number of the originating telephone. If either of the data records in database 24, which describe the originating and dialed number network end points, contain the FP code indicating that calls are to be set up with a conference bridge, and containing a network destination surveillance point number, then the FP code and the relevant network surveillance point destination number may be returned to the originating switch. The originating and dialed destination numbers may also be saved in an appropriate memory device for later retrieval and analysis.

The originating switch, upon receiving the FP code and the network surveillance point destination number, in the message being communicated from database 24, may automatically set up a connection from the originating telephone to the dialed number destination via a conference bridge. The remaining third port of that conference bridge 60 in this example may be connected to an outgoing trunk channel. A connection may be made to an automatic answer surveillance point at the far end of the trunk channel. Surveillance point 130 may be equipped with suitable audio recording equipment. The trunk channel may be configured as a four-wire channel to surveillance point 130. Digital to analog conversion may be used on the signal flowing into a channel communicated to surveillance point 130; a signal representing silence may be used continuously on a trunk channel flowing to conference bridge 60. This may prevent or minimize any audio echoes or other undesirable signals that might otherwise be perceived by the subject.

In an example embodiment of this invention, it may be desirable that a distinct FP code is used for legally authorized surveillance relating to subscriber requested surveillance, even though the actions due to this code may be the same as a code used for voluntary subscriber-requested surveillance, and both FP codes may also use a network surveillance point number to indicate the network address used for the surveillance connection. The subscriber-requested surveillance process need not be concealed from the subject. The specific FP code and network surveillance address used with it (when present in the FP database data record for any subscriber line) may not be displayed to the subscriber by any of the ways provided in the system that allow the subscriber to enter, modify, examine, or delete FP codes and related data for his/her network points. Methods to allow appropriately restricted access, protected by passwords and other authentication methods, are available and may be readily accommodated by the embodiment of FIG. 7.

Although the example embodiment of FIG. 7 illustrates a case of a destination telephone being served locally by an originating switch, the same surveillance capability may be available when the destination telephone is served by a distinct switch. To better understand the benefits of the provided surveillance application, the following may be noted: 1) some telephone switches may be provisioned with several three-port conference bridges for other reasons such that they are readily available in every originating switch; 2) in certain instances, only a software upgrade may be needed to install the surveillance capability in a switch; 3) leased line channels are not needed between any particular switch in the PSTN and the surveillance point; 4) instances of dialed numbers are captured by the surveillance process, even including add-on conference calls occurring after the initiation of an non-conference call; 5) when a target subject performs the previously described procedure to add-on another network point connected via a three-way conference bridge, this may be accomplished by connecting a port from each of two three-port conference bridges to give a conference bridge assembly with four ports, providing no evidence to the subject that any unusual monitoring or surveillance may be in effect; and 6) the surveillance is operational for cellular mobile radio-telephone applications. For example in mobile applications, the originating mobile service switch center (MSC) serving a mobile handset at the time it originates a call may be called the anchor switch for that call. Later in that call, a handover may occur between the anchor MSC and a second MSC when the mobile handset moves, during the conversation, from the radio coverage area of the anchor MSC to the radio coverage area of the second MSC. If this occurs, the surveillance can continue.

Although the present invention has been described with reference to particular components, architectures, devices, and components it should be appreciated that a number of changes, modifications, substitutions, and alterations may be made herein without departing from the scope of the present invention. Communication system 10 offers considerable flexibility in that it may be used for a number of other applications and provided with various additional components that facilitate the operations of the alternative applications. For example, various combinations of any or all of the capabilities of the present invention may be used in the same connection. Thus, a connection may be automatically established between a hearing user, a deaf user who uses a TTY, and a CA at a TRS. Additionally, one, two, or all three of the network points implicated or involved in the communication session may be located in the Internet in contrast to all being in the circuit-switched PSTN. In such a case, a gateway switch may be a traditional circuit-switched device, a packet-oriented soft-switch, or a combination of aspects of both technologies into a single switch assembly. The PSTN-VoIP interface may exist, for a particular connection, on either side of the gateway switch or it may be coincident with the gateway switch function.

In addition, multimedia connections utilizing digitally coded video and other digitally coded information may also be utilized in the Internet portion of a connection, in a connection completely within the Internet, in a digital dialed channel set up using integrated services digital network (ISDN) digital channels, or in a high bit-rate modem over a voice channel. An FP code may be suitably placed in the relevant data record to indicate that a particular subscriber has multi-media capabilities of a particular type (for example, SIP, Megaco, or H.323 protocol video support), as well as an FP code indicating that a particular end user may be deaf and may know American sign language (ASL). In such a case, a system may be implemented in which a connection may be automatically set up with a digitally coded video link between the deaf subscriber and the TRS connected to a CA position equipped with a video display and camera and staffed by a CA who may be fluent in ASL. The side of the connection to/from the non-deaf participant may be a voice only connection, and in general, a TTY is not used. In such a connection, the conversation may proceed at a much faster rate than via the use of a TTY. Also, the ASL interpreter can sign at substantially the same time the non-deaf person speaks, and speak at substantially the same time the deaf person signs.

In other embodiments, video-to-video (or multimedia-to-multimedia) connections may be set up directly (without the intervention of a TRS switch). Such an embodiment may require that appropriate FP codes indicating multi-medial capability in an appropriate setup protocol be used in relevant database records. The end participants in such connections may both be in the Internet, or both in the PSTN, or any combination thereof. Since, in general, multi-medial transmissions support both digitally coded voice as well as video, this service may be used for others that are not deaf. However, when both end participants are deaf and fluent in ASL, a video connection may be valuable for the same reasons described above.

In addition to the use of a video link to allow viewing a human ASL interpreter or signer, there are other technological alternative uses of visual displays related to ASL or other gesture-based visual communication languages that may be used in communication system 10. The position and attitude of the hands and/or body of a person using a gesture language may be sensed by various. technical tools: for example gloves with position and motion sensing capability. In this fashion, a person who is signing in ASL can have their words captured and either recorded, transmitted, or converted/translated into other representations bearing the same meaning. Conversely, traditional language text available in digitally coded form may be used to produce an alternate representation in the form of an animated graphic image of a synthetic person signing in ASL or other gesture-based languages. These capabilities can be combined with automatic speech-to-text translation.

Additionally, although communication system 10 has been described with reference to particular components, a number of additional or intervening components may be included in the architecture of communication system 10 without departing from the scope of the present invention. For example, other switches in the connection path may communicate a query to database 24 instead of the originating switch. Any other switch in the path of the call, including any transit switch and/or the destination switch (or a TRS switch), could be installed such that it generates the database query instead of originating end switch 14 or 16. The result of such a query may be embodied in an IAM, a Q.931 call setup message, or provided in any other suitable format where appropriate and in accordance with particular needs.

Also, database 24 may be partitioned in any suitable manner. For example, database 24 may be partitioned geographically, originating versus destination related FP codes, or in any other suitable fashion. Additionally, a separate FP database may be implemented that is used in conjunction with an existing LNP database. Other appropriate permutations are also contemplated and are within the scope of the broad teachings of communication system 10.

Numerous other changes, substitutions, variations, alterations, and modifications may be ascertained by those skilled in the art and it may be intended that the present invention encompass all such changes, substitutions, variations, alterations, and modifications as falling within the spirit and scope of the appended claims. Moreover, the present invention may be not intended to be limited in any way by any statement in the specification that may be not otherwise reflected in the appended claims.

What is claimed is:

1. A method for establishing a communication session, comprising:

receiving a query at a database, the query including a selected one or both of a phone number associated with a first end user and a phone number that was input by the first end user to establish a communication session with a second end user, the first end user reflecting a first point in the communication session and the second end user reflecting a second point in the communication session;

identifying a situation associated with the communication session based on a plurality of functional purpose (FP) codes stored in the database and associated with a selected one or more of the first and second end users, wherein a telecommunications relay service (TRS) routing number and a network routing number for a third point may be communicated to the end user; and communicating an initial address message (IAM), wherein a link associated with the communication session may be initiated in response to the IAM, and wherein if a successful connection is made to the link a communication assistant element may be invoked such that the communication session is facilitated between the first and second end users.

2. The method of claim 1, further comprising:
referencing a table in order to identify one or more of the FP codes, the FP codes being stored in the table and accessed by the database.

3. The method of claim 1, further comprising:
initiating a TRS switch element for the communication session directly using the IAM.

4. The method of claim 1, wherein one or more of the FP codes identify a configuration associated with the first and second end users, the end users using a selected one of voice and teletype elements to facilitate the communication session.

5. The method of claim 1, wherein the communication assistant element designates a language choice for the end users.

6. The method of claim 1, wherein the communication assistant element is configured such that deaf communications are converted into voice information for a selected one of the end users.

7. The method of claim 1, wherein eavesdropping on the communication session is executed based on a manipulation of one or more of the FP codes in order to achieve control of the communication assistant element.

8. The method of claim 7, wherein a surveillance point is provided to divert the communication session through the surveillance point in order to eavesdrop on the communication session.

9. The method of claim 1, further comprising:
providing an ancillary database operable to be coordinated with the database for exchanging information associated with the communication session.

10. The method of claim 1, further comprising:
providing a secondary table that is accessible by the database, the secondary table providing data that may be used to assign a cost value associated with one or more of a plurality of TRS centers, wherein the cost value may be used in order to determine an optimal TRS center from the plurality of TRS centers to be used in the communication session.

11. The method of claim 1, further comprising:
providing a conference bridge to establish the communication session among the end users, the conference bridge operable to exchange a selected one or more of text, video, and voice data between the end users.

12. The method of claim 1, further comprising:
selecting an optimal conference connection based on a selected one of a profile associated with a selected one of the end users and an FP code associated with a selected one of the end users.

13. The method of claim 12, further comprising:
adding additional end users to the communication session with one or more conference bridges that may be implemented incrementally into the communication session.

14. The method of claim 1, further comprising:
invoking additional communication assistant elements in order to facilitate the communication session, wherein the communication session prompts a compound interpretation of information that may be accommodated by the additional communication assistant elements.

15. A method for establishing a communication session, comprising:

receiving a query at a database for initiating a communication session associated with a first and a second end user;

identifying a situation associated with the communication session based on a plurality of functional purpose (FP) codes associated with a selected one or more of the first and second end users; and returning a routing number to the first end user, wherein an initial address message (IAM) may be communicated in order to activate a terminal for a configuration corresponding to the communication session such that the communication session is facilitated, and wherein the terminal comprises interfacing elements for the second end user to communicate with the first end user, the configuration being based on an internet protocol address.

16. The method of claim 15, further comprising:
providing an ancillary database operable to be coordinated with the database to exchange information associated with the communication session.

17. An apparatus for establishing a communication session, comprising:

a database operable to receive a query that includes a selected one or both of a phone number associated with a first end user and a phone number that was input by the first end user to establish a communication session with a second end user, the first end user reflecting a first point in the communication session and the second end user reflecting a second point in the communication session, the database identifying a situation associated with the communication session based on a plurality of functional purpose (FP) codes stored in the database and associated with a selected one or more of the first and second end users, wherein a telecommunications relay service (TRS) routing number and a network routing number for a third point may be communicated to the end user, the database being further operable to communicate an initial address message (IAM), a link associated with the communication session may be initiated in response to the IAM, and wherein if a successful connection is made to the link a communication assistant element may be invoked such that the communication session is facilitated between the first and second end users.

18. The apparatus of claim 17, wherein the database is further operable to reference a table in order to identify one or more of the FP codes, the FP codes being stored in the table and accessed by the database.

19. The apparatus of claim 17, wherein the database is further operable to initiate a TRS switch element for the communication session directly using the IAM.

20. The apparatus of claim 17, wherein one or more of the FP codes identify a configuration associated with the first and second end users, the end users using a selected one of voice and teletype elements to facilitate the communication session.

21. The apparatus of claim 17, wherein eavesdropping on the communication session is executed based on a manipulation of one or more of the FP codes in order to achieve control of the communication assistant element.

22. The apparatus of claim 17, further comprising:
a surveillance point operable to divert the communication session through the surveillance point in order to eavesdrop on the communication session.

23. The apparatus of claim 17, further comprising:
an ancillary database operable to be coordinated with the database to exchange information associated with the communication session.

24. The apparatus of claim 17, further comprising:
a secondary table accessible by the database and operable to provide data that may be used to assign a cost value associated with one or more of a plurality of TRS centers, wherein the cost value may be used in order to determine an optimal TRS center from the plurality of TRS centers to be used in the communication session.

25. The apparatus of claim 17, further comprising:
a conference bridge operable to establish the communication session among the end users, the conference bridge being further operable to exchange a selected one or more of text, video, and voice data between the end users.

26. The apparatus of claim 17, wherein an optimal conference connection may be selected based on a selected one of a profile associated with a selected one of the end users and an FP code associated with a selected one of the end users.

27. The apparatus of claim 26, wherein additional end users may be added to the communication session with one or more conference bridges that may be implemented incrementally into the communication session.

28. A system for establishing a communication session, comprising:
means for receiving a query, the query including a selected one or both of a phone number associated with a first end user and a phone number that was input by the first end user to establish a communication session with a second end user, the first end user reflecting a first point in the communication session and the second end user reflecting a second point in the communication session;
means for identifying a situation associated with the communication session based on a plurality of functional purpose (FP) codes associated with a selected one or more of the first and second end users, wherein a telecommunications relay service (TRS) routing number and a network routing number for a third point may be communicated to the end user; and
means for communicating an initial address message (IAM), wherein a link associated with the communication session may be initiated in response to the IAM, and wherein if a successful connection is made to the link a communication assistant element may be invoked such that the communication session is facilitated between the first and second end users.

29. The system of claim 28, further comprising:
means for eavesdropping on the communication session based on a manipulation of one or more of the FP codes in order to achieve control of the communication assistant element.

30. The system of claim 28, further comprising:
means for providing data that may be used to assign a cost value associated with one or more of a plurality of TRS centers, wherein the cost value may be used in order to determine an optimal TRS center from the plurality of TRS centers to be used in the communication session.

31. The system of claim 28, further comprising:
means for providing a conference communication session among the end users, the conference communication session being operable to exchange a selected one or more of text, video, and voice data between the end users.

32. The system of claim 28, further comprising;
means for incrementally adding additional end users to the communication session.

33. Software for establishing a communication session, the software being embodied in a computer readable medium and including code, that when executed, is operable to:
receive a query, the query including a selected one or both of a phone number associated with a first end user and a phone number that was input by the first end user to establish a communication session with a second end user, the first end user reflecting a first point in the communication session and the second end user reflecting a second point in the communication session;
identify a situation associated with the communication session based on a plurality of functional purpose (FP) codes associated with a selected one or more of the first and second end users, wherein a telecommunications relay service (TRS) routing number and a network routing number for a third point may be communicated to the end user; and
communicate an initial address message (IAM), wherein a link associated with the communication session may be initiated in response to the IAM, and wherein if a successful connection is made to the link a communication assistant element may be invoked such that the communication session is facilitated between the first and second end users.

34. The medium of claim 33, wherein the code is further operable to:
reference a table in order to identify one or more of the FP codes.

35. The medium of claim 33, wherein the code is further operable to:
eavesdrop on the communication session based on a manipulation of one or more of the FP codes in order to achieve control of the communication assistant element.

36. The medium of claim 33, wherein the code is further operable to:
divert the communication session through a surveillance point in order to eavesdrop on the communication session.

37. The medium of claim 33, wherein the code is further operable to:
provide a conference communication session among the end users, the conference communication session being operable to exchange a selected one or more of text, video, and voice data between the end users.

38. The medium of claim 33, wherein the code is further operable to:
select an optimal conference connection based on a selected one of a profile associated with a selected one of the end users and an FP code associated with a selected one of the end users.

39. The medium of claim 33, wherein the code is further operable to:
incrementally add additional end users to the communication session.

40. The medium of claim 33, wherein the code is further operable to:
invoke additional communication assistant elements in order to facilitate the communication session, wherein the communication session prompts a compound interpretation of information that may be accommodated by the additional communication assistant elements.

41. A method for establishing a communication session, comprising;
accessing a database that is operable to store a plurality of functional purpose (FP) codes associated with a selected one or more end users;
determining, from a selected one or more of the FP codes, that an originating end user that is seeking to establish a communication session has one or more incompatible properties with a destination end user;
identifying an intermediate switching element that comprises one or more translator elements for facilitating the communication session, and
establishing a connection from a first location associated with the originating end user to a second location associated with a destination end user.

42. The method of claim 41, wherein one or more of the translator elements is a human translator operable to translate one or more human languages between the originating end user and the destination end user.

43. The method of claim 41, wherein one or more of the translator elements is operable to transcode digital information from a source format into a destination format.

44. The method of claim 41, wherein one or more of the translator elements is a software human-language translator system operable to facilitate the communication session between the originating end user and the destination end user.

45. The method of claim 41, wherein the intermediate switching element is a telecommunications relay center (TRS) switch operable to provide translation services for one or more of the end users that are communication impaired persons.

46. The method of claim 41, wherein to initiate the communication session one or more of the end users utilize a selected one of a group of elements consisting of:
a telephone;
a mobile station;
a computer terminal; and
a data terminal that may be used by a selected one or more of the users that is communication impaired.

47. An apparatus for establishing a communication session, comprising:
a gateway switch operable to couple a public switched telephone network (PSTN) and an Internet element, the gateway switch being coupled to a database operable to receive a query for initiating a communication session associated with a first and a second end user, wherein the database is operable to identify a situation associated with the communication session based on a plurality of functional purpose (FP) codes associated with a selected one or more of the first and second end users, a routing number being returned to the first end user and an initial address message (IAM) being communicated in order to activate a terminal for a configuration corresponding to the communication session such that the communication session is facilitated.

48. The apparatus of claim 47, further comprising:
an ancillary database operable to be coordinated with the database to exchange information associated with the communication session.

49. The apparatus of claim 47, wherein the terminal comprises interfacing elements for the second end user to communicate with the first end user.

50. The apparatus of claim 47, wherein the configuration is based on an internet protocol address associated with a selected one of the first and second end users.

* * * * *